(12) United States Patent
Vinegar et al.

(10) Patent No.: US 9,784,882 B2
(45) Date of Patent: Oct. 10, 2017

(54) MAPPING HYDROCARBON LIQUID PROPERTIES OF A KEROGENCONTAINING SOURCE ROCK

(71) Applicants: GENIE IP B.V., Amsterdam (NL); Harold Vinegar, Bellaire, TX (US); Scott Nguyen, Houston, TX (US); Eva Vinegar, Bellaire, TX (US)

(72) Inventors: Eva Vinegar, Bellaire, TX (US); Scott Nguyen, Austin, TX (US); Harold Vinegar, Bellaire, TX (US)

(73) Assignee: GENIE IP B.V., Amsterdam (NL)

( * ) Notice: Subject to any disclaimer, the term of this patent is extended or adjusted under 35 U.S.C. 154(b) by 432 days.

(21) Appl. No.: 14/412,702

(22) PCT Filed: Jul. 4, 2013

(86) PCT No.: PCT/IB2013/055492
§ 371 (c)(1),
(2) Date: Jan. 5, 2015

(87) PCT Pub. No.: WO2014/006592
PCT Pub. Date: Jan. 9, 2014

(65) Prior Publication Data
US 2015/0168588 A1 Jun. 18, 2015

Related U.S. Application Data

(63) Continuation-in-part of application No. PCT/IB2013/054090, filed on May 18, 2013.
(Continued)

(51) Int. Cl.
*G01V 3/18* (2006.01)
*G01V 3/38* (2006.01)
(Continued)

(52) U.S. Cl.
CPC ............... *G01V 3/38* (2013.01); *G01V 3/02* (2013.01); *G01V 3/06* (2013.01); *G01V 3/24* (2013.01)

(58) Field of Classification Search
CPC ... G01V 3/00; G01V 3/02; G01V 3/04; G01V 3/06; G01V 3/08; G01V 3/24; G01V 13/38
See application file for complete search history.

(56) References Cited

U.S. PATENT DOCUMENTS 5,049,738 A * 9/1991 Gergely ............... E21B 49/08
250/255
7,340,348 B2 * 3/2008 Strack ................. G01V 3/083
702/14

(Continued)

*Primary Examiner* — Huan Tran
(74) *Attorney, Agent, or Firm* — Marc Van Dyke; Fourth Dimension IP

(57) ABSTRACT

A method is disclosed for generating an areal map of a pre-determined hydrocarbon liquid property of a subsurface kerogen-containing source rock from an electromagnetic resistivity profile. Preferably, the profile is generated by a transient EM method such as a long-offset transient electromagnetic (LOTEM) method. In some embodiments, the areal map is generated by employing resistivity-hydrocarbon liquid-quality relationship data describing a relationship between (i) a property of hydrocarbon liquid generated within the source rock pore space to (ii) an electrical resistivity of the source rock. In some embodiments, it is possible to acquire such data even in the absence of source rock samples where the hydrocarbon liquids within the samples has been preserved. The areal map is useful for determining a target location and/or depth in the source rock to drill for oil. The presently-disclosed techniques are particularly relevant to tight oil formations.

20 Claims, 26 Drawing Sheets

Related U.S. Application Data

(60) Provisional application No. 61/668,006, filed on Jul. 4, 2012.

(51) Int. Cl.
*G01V 3/06* (2006.01)
*G01V 3/24* (2006.01)
*G01V 3/02* (2006.01)

(56) References Cited

U.S. PATENT DOCUMENTS

| | | | | |
|---|---|---|---|---|
| 2005/0017722 | A1* | 1/2005 | Ellingsrud | G01V 3/12 324/334 |
| 2011/0050232 | A1* | 3/2011 | Wilt | G01V 3/30 324/334 |
| 2011/0108283 | A1* | 5/2011 | Srnka | G01V 11/00 166/369 |

* cited by examiner

|  | Acquiring Resistivity Data | |
|---|---|---|
|  | Rock Samples | Well Log |
| Acquiring Maturity Indicator Data — Rock Samples | OPTION E | OPTION F |
| Acquiring Maturity Indicator Data — Well Log | OPTION G | OPTION H |

FIG. 14

MAPPING HYDROCARBON LIQUID PROPERTIES OF A KEROGENCONTAINING SOURCE ROCK

BACKGROUND AND RELATED ART

Hydrocarbon exploration is the search for oil and gas accumulations in the subsurface of the Earth. Oil and gas exploration is typically high risk, with most oil wells that are drilled failing to find hydrocarbons or having too little production to be economic. Since oil and gas wells are expensive, ranging in cost from $100,000 for shallow onshore wells to $100 million for deep offshore wells, there is great incentive to improve the probability of exploration success.

Thus, various geophysical tools are used by geophysicists and geologists to assist in hydrocarbon exploration, including gravity, magnetics, and seismic methods. These geophysical tools typically look for structural changes in the subsurface where oil and gas may be trapped, for example, at faults or anticlinal structures.

Other types of geophysical exploration tools are electrical resistivity and electromagnetic surveys. These exploration tools rely on the principle that brine is an electrical conductor while oil and gas are electrical insulators. Thus if oil and gas are present in the pore space of a reservoir rock, the electrical resistivity is higher than if brine only were present.

In a petroleum prospect, a source rock containing solid organic matter (kerogen) is buried to deeper subsurface depths over millions of years as more sediment is deposited on top. With increasing time and temperature, the kerogen gradually matures to a liquid hydrocarbon called bitumen, which is rich in polar compounds and thus adheres to the kerogen surface. With still further maturation, the bitumen matures to a mobile oil which displaces some brine from the source rock. The electrical resistivity of the source rock increases as brine is displaced from the pores of the source rock. Some of the oil typically migrates from the source rock to a reservoir rock under the combination of influences of buoyancy (the oil is lighter than the brine), compaction of the pore space of the source rock as it is buried deeper, and thermal expansion of the fluids.

Van Krevelen classified the types of kerogen into three broad classes based on their hydrogen and oxygen indices. Type I kerogens have a high hydrogen index (HI) and low oxygen index (OI); they are derived from algal matter deposited in lacustrine environments. Type II kerogens are also high HI but higher OI and are derived from marine organisms in deep marine environments; and Type III have low HI and high OI and are derived from woody matter in shallow swamps and lagoons. Type II-s kerogens are a sub class of Type II kerogen having in addition high sulfur content. The weight percent sulfur in Type II-s kerogen can range up to about 10 wt %.

In most cases, when hydrocarbon deposits are found at shallow depths, it is because the oil and gas has migrated into a reservoir rock after being generated and expelled from a much deeper source rock. The maturation history of most kerogens (Types I, II and III) requires the source rock to be buried very deeply in order to begin generation of bitumen and oil, typically 3 kilometers or more. However, because the sulfur-sulfur and sulfur-carbon bonds in the Type II-s kerogen are more thermally unstable, the generation of bitumen and oil may begin at surprisingly lower temperatures or depths in a Type II-s kerogen.

SUMMARY OF EMBODIMENTS

The present inventors are now disclosing a technique for remotely characterizing the quality of oil contained in source rock. The quality of the source-rock-resident oil varies with source-rock maturation which affects the specific resistivity of the source rock.

Embodiments of the present invention relate to methods and apparatus for (i) generating an electrical or electromagnetic resistivity profile (e.g. by long-offset controlled-source electromagnetic techniques or by magnetotellurics techniques) of subsurface kerogen-containing source rock; and (ii) converting the resistivity profiles into an areal map of a pre-determined hydrocarbon liquid property at shallow depths of the source rock.

In some embodiments, the kerogen-containing source rock is at relatively shallow depths of less than 3 kM or less than 2 kM.

In contrast to techniques which only identify a presence or absence of hydrocarbon liquids, the presently disclosed teachings can be used to remotely measure the quality of these liquids. This may be especially useful in locations where the oil quality varies—for example, due to variations in maturity of the source rock.

It is believed that the presently-disclosed teachings may play an important role in exploration for unconventional oils, many of which are contained within tight source rock in large, areally-extensive basins. As such, there is an ongoing and unmet need for techniques that zero-in on sweet spots within these basins of unconventional oil.

Although not a limitation, it is believed that the presently disclosed techniques are particularly applicable to (i) type IIs kerogen formations which mature at relatively shallow depths or (ii) type I kerogen formations subjected to high geothermal gradients so that maturation could have occurred even at relatively shallow depths.

In order to convert resistivity data into data descriptive of a hydrocarbon liquid property, it is possible to acquire resistivity-hydrocarbon liquid property relationship data (e.g. in the form of a look-up table or as a mathematical function) specific to the source rock or samples thereof. This resistivity-hydrocarbon liquid property relationship data relates: (i) a property of hydrocarbon liquid within source rock pore space to (ii) an electrical resistivity of the source rock. As will be discussed below, in some embodiments, it is possible to acquire such data even in the absence of source rock samples where the hydrocarbon liquids within the samples have been preserved.

Exemplary hydrocarbon liquid properties that can be mapped include but are not limited to sulfur content, API gravity, and viscosity.

Some of the aforementioned hydrocarbon liquid properties are quality metrics describing a quality of the hydrocarbon liquid—for example, sulfur content, API gravity, and viscosity. In some embodiments, the hydrocarbon liquid parameter is a hydrocarbon liquid quality metric.

Once an areal map is generated, it is possible to drill to a target location and/or depth selected in accordance with values of the pre-determined hydrocarbon liquid property at different locations in the source rock. In one example, it may be desired to maximize or minimize a value of the hydrocarbon liquid property within the source rock—e.g. to select a target location having a minimum API gravity or a maximum viscosity or a maximum sulfur % concentration. In another example, one or more hydrocarbon liquid properties may be associated with a pre-determined threshold value, and a target location is selected contingent upon results of a comparison between (i) a value of hydrocarbon liquid property (i.e. estimated according to a remote resistivity measurement); and (ii) the pre-determined threshold. For example, production wells may only be drilled at a location and/or to a depth where it is estimated (i.e. according to a remote resistivity measurements) that the API gravity of hydrocarbon liquid thereat exceeds an API threshold value and/or that a viscosity of hydrocarbon liquid thereat is less than a maximum allowed viscosity and/or a sulfur % concentration of hydrocarbon liquid thereat is less than a maximum allowed sulfur % concentration.

As noted above, the method relies upon the availability of resistivity-hydrocarbon liquid-quality relationship data. In order to acquire this data, a set of 'liquid preserved' source rock samples is preferably procured —i.e. source rock samples where the liquid hydrocarbons and brine are maintained within In this case, it is possible to measure, for each given source rock sample of the sample set, both (i) the respective resistivity thereof; and (ii) a respective value of the hydrocarbon liquid property of the hydrocarbon liquid that has been maintained within the given source rock sample. It is possible to generate, from this measurement table, a look-up table or mathematical function relating resistivity values and values of the hydrocarbon liquid property. In order to avoid overfitting to redundant (or nearly redundant) data-points, it is preferred to employ a source rock sample set that spans significantly different levels of maturity. In one example, samples of significantly different maturity may be extracted from different locations in the source rock. Alternatively or additionally, source rock samples may be artificially matured in the laboratory, as will be discussed in greater detail below.

Although the preferred scenario is when a set of liquid-preserved source rock samples are available, this is not a requirement. As noted above, in some embodiments, it is possible to acquire resistivity-hydrocarbon liquid-quality relationship data even in the absence of source rock samples where the hydrocarbon liquids within the samples have not been preserved. Thus, in some embodiments, in the absence of direct measurements of hydrocarbon liquids and brine associated with the source rock sample, it is possible to (i) acquire rock maturity indicator data describing rock maturity for each source rock sample; and (ii) convert the rock maturity indicator data into hydrocarbon liquid property data describing a value, for the hydrocarbon liquid that used to be in the source rock sample before it was removed from the formation, of the hydrocarbon liquid property. Towards this end, data correlating values of a pre-determined hydrocarbon liquid property to a source rock maturity indicator may be used.

Rock maturity indicators include but are not limited to Tmax, vitrinite reflectance, and Time-Temperature-Index (TTI).

Some embodiments relate to a method of hydrocarbon exploration within a subsurface kerogen-containing source rock comprising: (a) acquiring resistivity-hydrocarbon liquid property relationship-data of at least one of: i. a set of samples of the source rock., the sample set spanning significantly different levels of maturity; and ii. well-log data for a plurality of calibration locations within the source rock, the well-log data spanning significantly different levels of maturity; (b) measuring an electric or electromagnetic resistivity profile of the subsurface kerogen containing source rock using an electromagnetic profiling method, and (c) drilling for oil at a target location and/or depth, within the source rock, that is determined in accordance with: (i) the electric or electromagnetic resistivity profile of the subsurface kerogen containing source rock; and (ii) the resistivity-hydrocarbon liquid property relationship data of the set of source rock samples and/or well-log data.

In some embodiments, the hydrocarbon liquid property is selected from sulfur content, API gravity, and viscosity.

In some embodiments, the electrical or electromagnetic profiling method is one or more of the following: magnetotellurics, controlled source audio magnetotellurics, time domain electromagnetic profiling, long-offset transient electromagnetic profiling, and electrode resistivity profiling.

In some embodiments, the acquired resistivity-hydrocarbon liquid property relationship-data is descriptive of the set of source rock samples.

In some embodiments, the acquired resistivity-hydrocarbon liquid property relationship-data is descriptive of the set of the well-log data.

In some embodiments, the acquired resistivity-hydrocarbon liquid property relationship-data is derived from laboratory resistivity measurements of each of the source rock samples.

In some embodiments, the acquired resistivity-hydrocarbon liquid property relationship-data is derived from well-log resistivity measurements at the calibration locations within the source rock.

In some embodiments, the acquired resistivity-hydrocarbon liquid property relationship-data is derived from direct laboratory property measurements of hydrocarbon liquid of the source rock samples that is removed therefrom within the laboratory and subjected to the property measurement(s).

In some embodiments, the acquired resistivity-hydrocarbon liquid property relationship-data is derived from maturity indicator measurements of samples of the sample set, the maturity measurement indicators being correlated with liquid property data.

In some embodiments, the maturity indicator is one or more of the following: Tmax, vitrinite reflectance, and Time-Temperature-Index (TTI).

In some embodiments, the maturity indicator is Tmax and the values of Tmax are in the range of 420 to 450° C., preferably between 420 to 443° C.

In some embodiments, the acquired resistivity-hydrocarbon liquid property relationship-data is derived from in situ well-log measurements of the hydrocarbon liquid property at the calibration locations.

In some embodiments, the acquired resistivity-hydrocarbon liquid property relationship-data is derived from artificially matured source rocks samples which comprise the source rock sample set.

In some embodiments, the artificially matured source rocks samples are matured using at least one of the following techniques: hydrous pyrolysis, dry open cell pyrolysis, or leaky cell pyrolysis.

In some embodiments, a depth, within the source rock, of both: i. the target location and/or depth; and ii. extraction locations of the samples of the sample set, is at most 2 kilometers.

In some embodiments, a depth, within the source rock, of both: i. the target location and/or depth; and ii. extraction locations of the samples of the sample set, is at most 1 kilometers.

In some embodiments, a depth, within the source rock, of both: i. the target location and/or depth; and ii. the well-log calibration locations, is at most 2 kilometers.

In some embodiments, a depth, within the source rock, of both: i. the target location and/or depth; and ii. the well-log calibration locations, is at most 1 kilometer.

In some embodiments, in addition seismic reflection data is used to measure the depth and thickness of the source rock.

In some embodiments the seismic data is used to determine the compressional and/or shear velocity in the source rock.

In some embodiments, the source rock comprises kerogen of Type II-s.

In some embodiments, the source rock comprises a bituminous chalk.

In some embodiments the source rock is of Cretaceous age.

In some embodiments, the well-log data includes NMR well-log data of hydrocarbon liquid viscosity at one or more subsurface locations within source rock, the resistivity-hydrocarbon liquid property relationship-data being derived from the NMR well-log data.

It is now disclosed a method of hydrocarbon exploration within a subsurface kerogen-containing source rock comprising: (a) obtaining, from the subsurface kerogen-containing source rock, at least one of: i. a set of samples of the source rock., the sample set spanning significantly different levels of maturity; and ii. well-log data for a plurality of calibration locations within the source rock, the well-log data spanning significantly different levels of maturity; (b) acquiring resistivity-hydrocarbon liquid property relationship-data of the sample set and/or well-log data; (c) measuring an electric or electromagnetic resistivity profile of the subsurface kerogen containing source rock using an electromagnetic profiling method, and (d) drilling for oil at a target location and/or depth, within the source rock, that is determined in accordance with: (i) the electric or electromagnetic resistivity profile of the subsurface kerogen containing source rock; and (ii) the resistivity-hydrocarbon liquid property relationship data of the set of source rock samples and/or well-log data.

BRIEF DESCRIPTION OF THE DRAWINGS

FIG. 14 illustrates various combinations related to acquisition of resistivity data and source rock maturity data.

DETAILED DESCRIPTION OF EMBODIMENTS

The invention is herein described, by way of example only, with reference to the accompanying drawings. With specific reference now to the drawings in detail, it is stressed that the particulars shown are by way of example and for purposes of illustrative discussion of the preferred embodiments of the exemplary system only and are presented in the cause of providing what is believed to be a useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice and how to make and use the embodiments.

For brevity, some explicit combinations of various features are not explicitly illustrated in the figures and/or described. It is now disclosed that any combination of the method or device features disclosed herein can be combined in any manner—including any combination of features—any combination of features can be included in any embodiment and/or omitted from any embodiments.

As source rock matures, some kerogen therein is converted into bitumen, and with further maturation, some bitumen is converted into oil which partially fills the pore space of the source rock. It is believed that the resistivity of source rock correlates with properties of the bitumen and oil (hydrocarbon liquids). By remotely measuring an electrical resistivity profile, it is possible to remotely detect and map one or more hydrocarbon liquid properties of the source rock (i.e. hydrocarbon liquid property of hydrocarbon liquid within pore space of the source rock). In some embodiments, it is possible to (i) locate production well(s) and/or (ii) cap and perforate a production well in accordance to the remotely measured (i.e. by means of the electrical resistivity profile) hydrocarbon liquid properties.

For the present disclosure, the following abbreviations are used: Time-Temperature-Index (TTI), hydrocarbon liquid property (HLP), maturity indicator (MI), resistivity (RES), Productivity Index (PI) and partially mature (PM).

Figure 1:
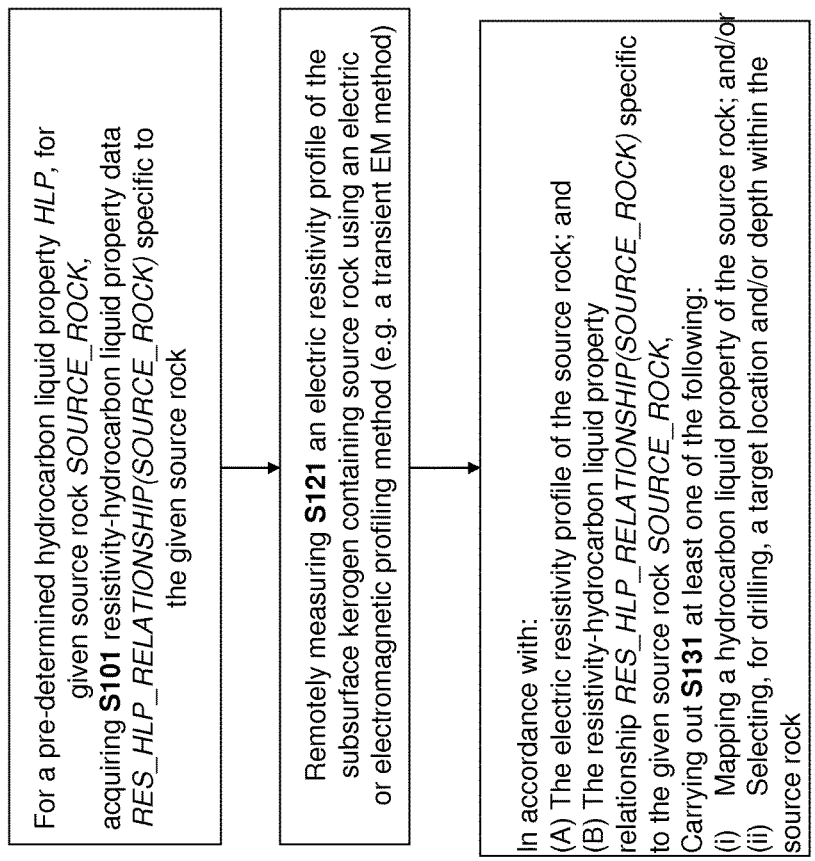
FIGS. 1, 6, 8 and 12 are flow charts of techniques for mapping hydrocarbon liquid properties of the subsurface and/or for selecting a drilling location in accordance with remote measurements of a resistivity profile of the source rock according to some embodiments.

FIG. 1 is a flow chart of a techniques for mapping hydrocarbon liquid properties of the subsurface and/or for selecting a drilling location in accordance with remote measurements of an electrical resistivity profile of the source rock. In step S101, for a given source rock SOURCE_ROCK, resistivity-hydrocarbon liquid property data RES_HLP(SOURCE_ROCK) specific to the given source rock is acquired.

As source rock matures, brine within pore space tends to get replaced by hydrocarbon liquids. The resistivity of source rock therefore tends to monotonically increase with maturity of the source rock. Furthermore, as source rock matures, an API gravity of hydrocarbon fluids in pore space thereof tends to increase, and a sulfur content of hydrocarbon fluids thereof tends to decrease.

Figure 2:
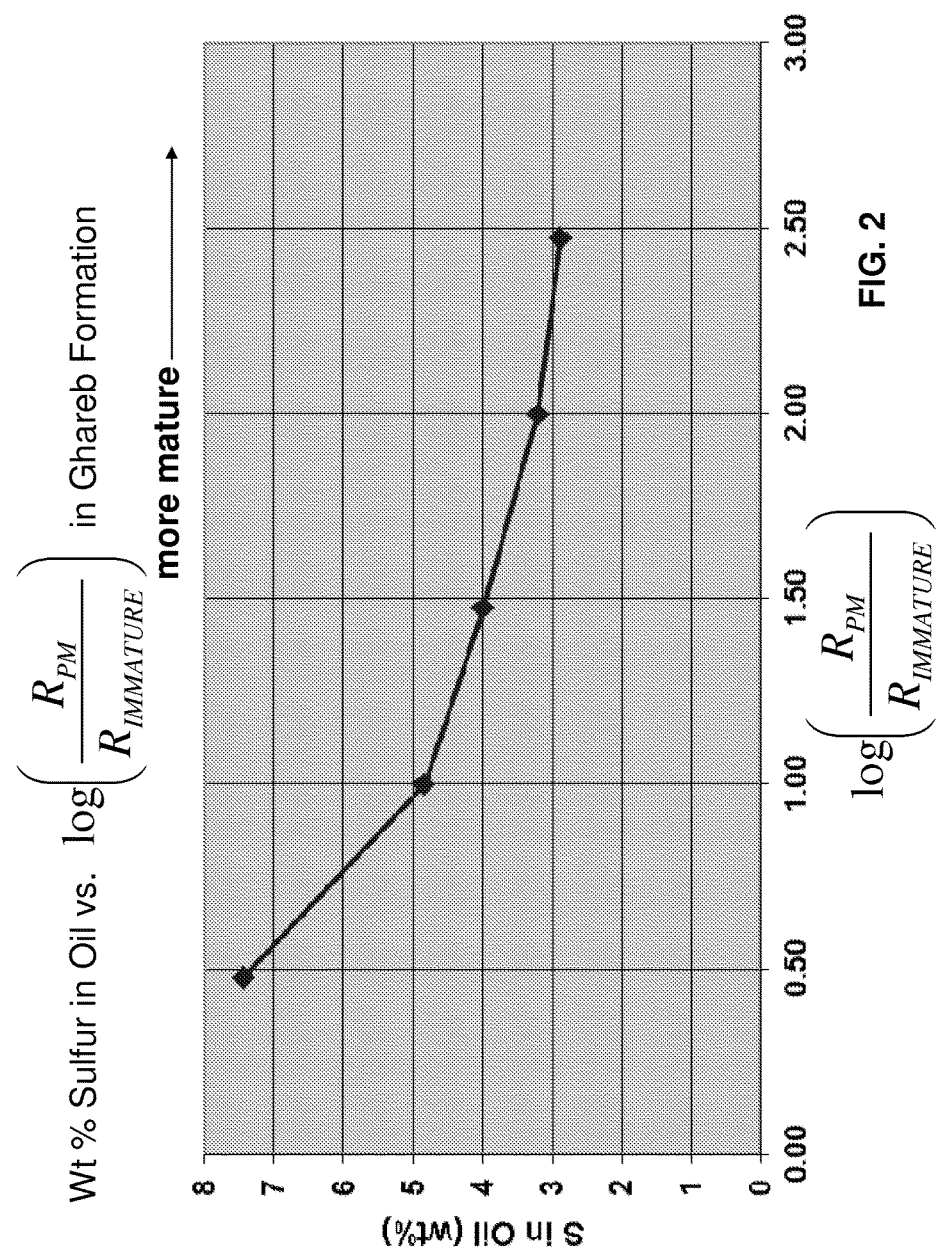
FIGS. 2-3 are graphs of resistivity-hydrocarbon liquid property relationship RES_HLP_RELATIONSHIP (SOURCE) specific for a source rock of the Ghareb Formation where in FIG. 2 the hydrocarbon liquid property is sulfur content and in FIG. 3 the hydrocarbon liquid property is API gravity.

FIG. 2 illustrates resistivity-hydrocarbon liquid property data RES_HLP(SOURCE_ROCK) in the Ghareb formation for the hydrocarbon liquid property HLP sulfur content. In the present disclosure, PM is an abbreviation for 'partially mature,' is $R_{PM}$ is the resistivity of partially mature source rock at different stages of maturity, $R_{IMMATURE}$ is the resistivity of completely immature source rock. As the sources rock matures, a resistance thereof increases, and therefore $R_{PM}$, $$\frac{R_{PM}}{R_{IMMATURE}}$$

and $$\log\left(\frac{R_{PM}}{R_{IMMATURE}}\right)$$

all increase. Because the sulfur content of the pore-space-resident hydrocarbon fluids tends to decrease with increasing maturity, the curve of FIG. 2, representing RES_HLP (SOURCE_ROCK) (i.e. where HLP is sulfur content) tends to decrease.

Figure 3:
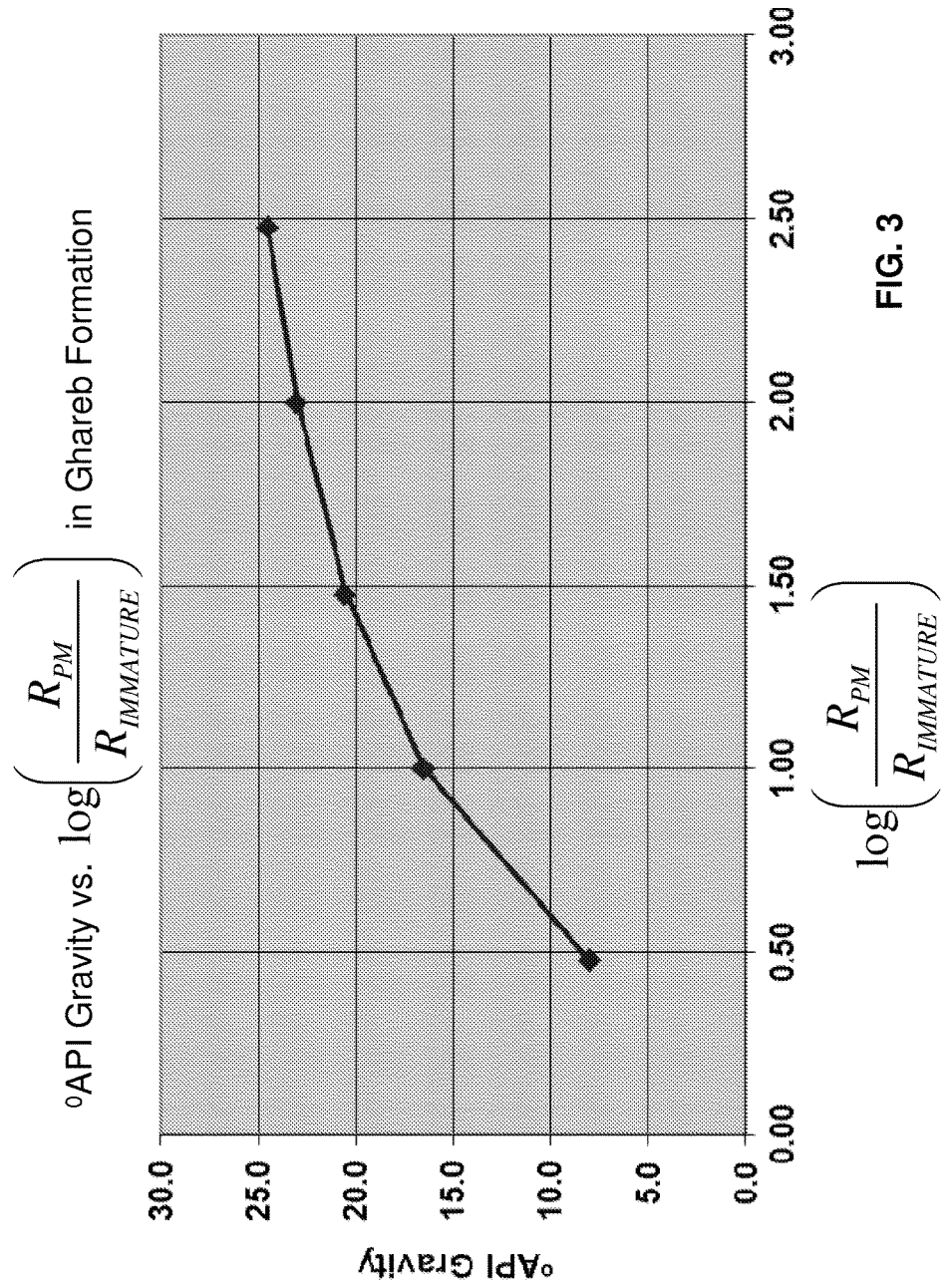

Conversely, because the API gravity of the pore-space-resident hydrocarbon fluids tends to increase with increasing maturity, the curve of FIG. 3, representing RES_HLP (SOURCE_ROCK) (i.e. where HLP is API gravity) tends to increase.

For the properties of sulfur content and API gravity, curves of FIGS. 2-3, respectively represent a mathematical transformation between source rock electric resistivity and the respective HLP property. After measuring an electric resistivity profile of the subsurface hydrocarbon-containing source rock in step S121 of FIG. 1 (i.e. using an electric or electromagnetic resistivity profiling method such as magnetotellurics), it is possible to mathematically transform values of electrical resistivity into values of any HLP property. Using the mathematical transformation of defined by the curve of FIG. 2, it is possible to transform values of electrical resistivity into values of sulfur concentration. Using the mathematical transformation defined by the curve of FIG. 3, it is possible to transform values of electrical resistivity into values of API gravity.

Figure 4:
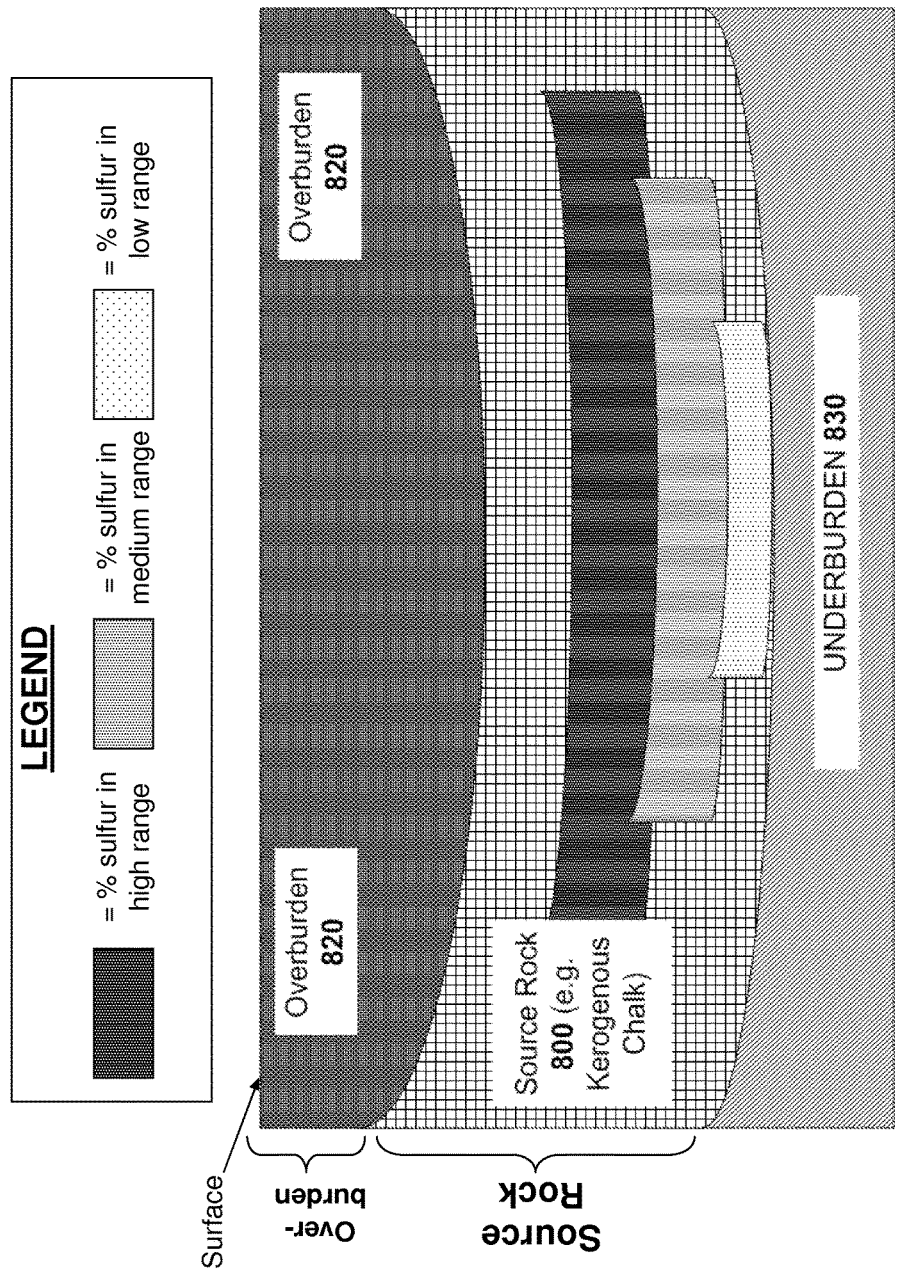
FIG. 4 is an areal map of a hydrocarbon liquid property HLP of a subsurface source rock according to one example, where the hydrocarbon liquid property HLP is sulfur % of hydrocarbon liquid within the pore space of the source rock.

Since the resistivity profile represents an areal map of electrical resistance within the source rock, mathematically transforming this areal map into any pre-determined hydrocarbon liquid property (i.e. a property of hydrocarbon liquids within pore space of source rock) yields an areal map specific to the pre-determined hydrocarbon liquid property. One example of such an areal map is illustrated in FIG. 4 which relates to sulfur concentration as the HLP and illustrates regions of relatively high, medium and low sulfur concentration.

Figure 5A:
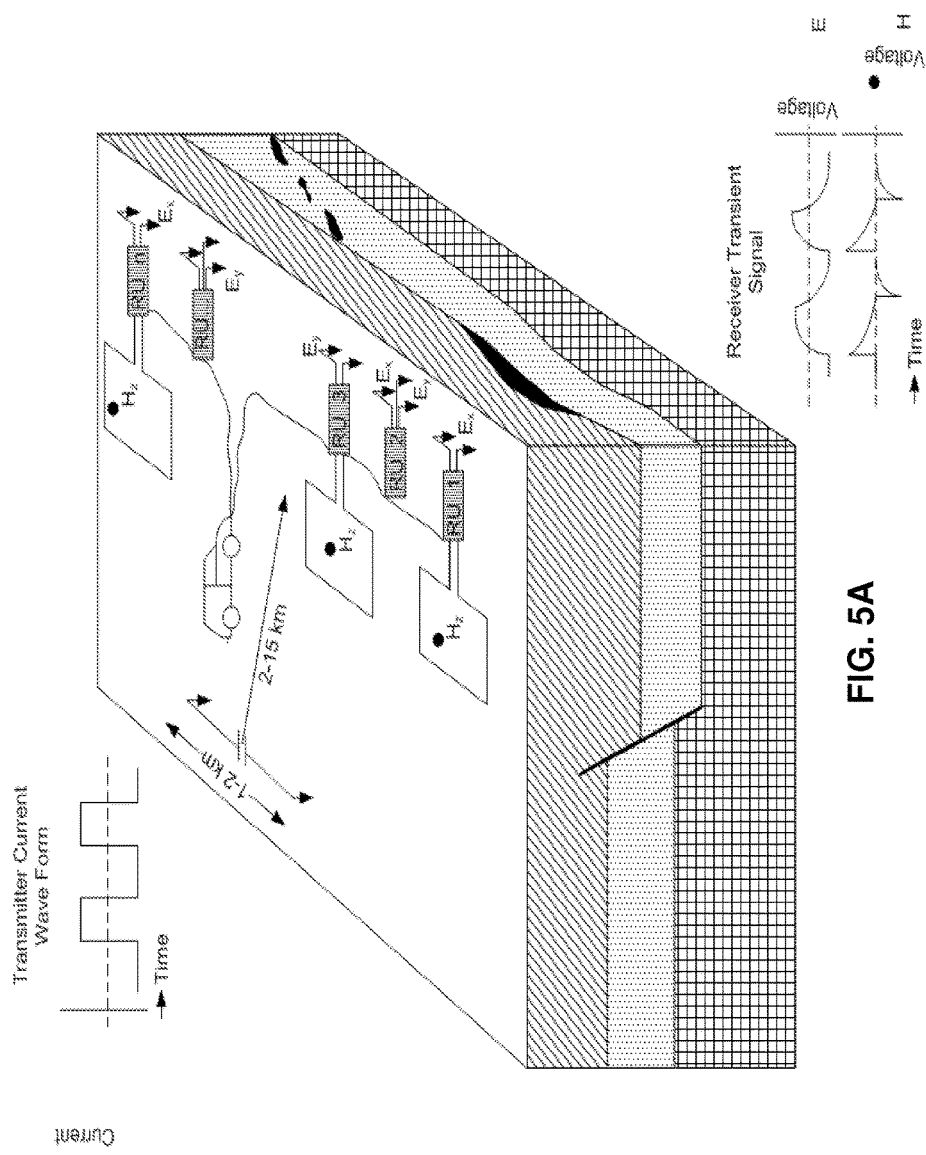
FIGS. 5A-5B show two types of electromagnetic resistivity profiling methods.
Figure 5B:
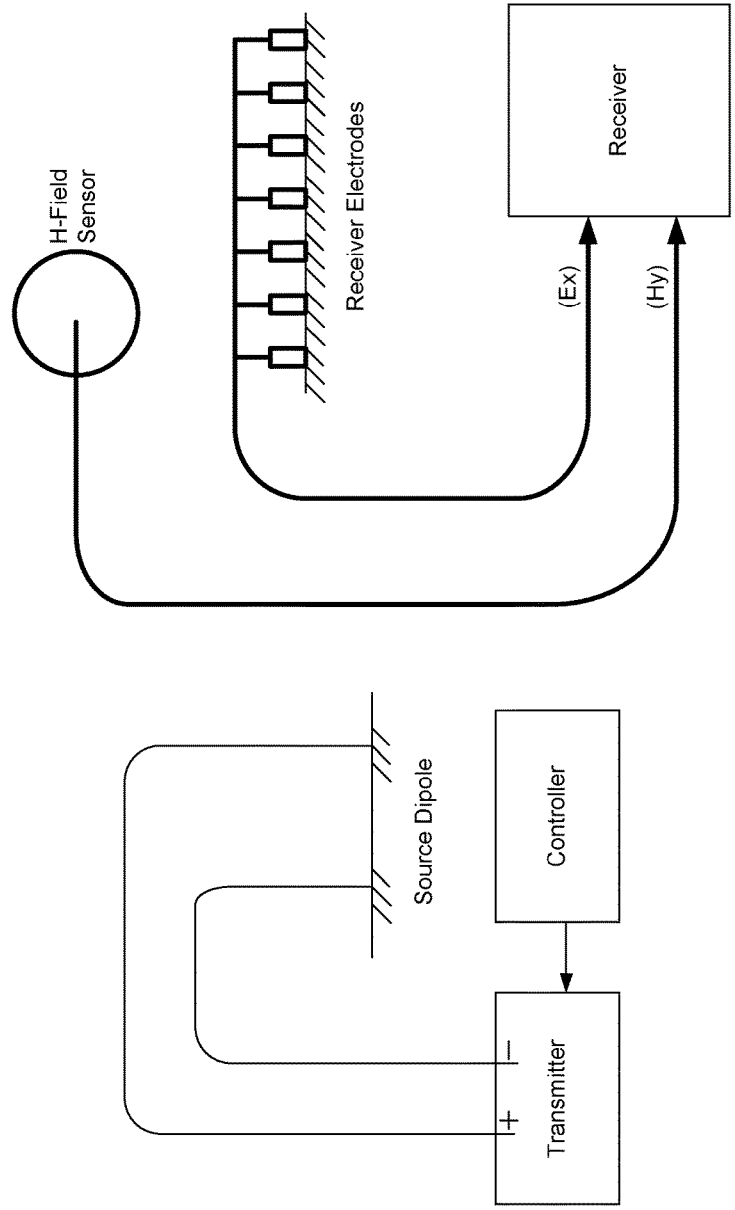

As noted above, in step S121 of FIG. 1, an electric resistivity profile of the subsurface hydrocarbon-containing source rock is measured in step S121 of FIG. 1 (i.e. using an electric or electromagnetic profiling method such as magnetotellurics). FIGS. 5A-5B relate to non-limiting examples for measuring the electrical resistivity profile.

FIG. 5A illustrates a typical field layout for LOTEM (long offset transient electromagnetics); FIG. 5B shows a CSAMT (controlled-source audio magnetotellurics) station. All are electromagnetic survey methods that use time-varying electric (E) and magnetic (H) fields at the Earth's surface to obtain an electrical resistivity profile of the subsurface. The higher frequency electromagnetic fields are attenuated at shallower depths while the lower frequency electromagnetic fields penetrate deeper. The MT method, which uses the Earth's naturally-occurring electromagnetic fields, was developed in the 1950's and the CSAMT method, which uses an active electromagnetic source or sources, was developed in the 1970's.

MT/CSAMT have been used as complements for seismic data in hydrocarbon exploration and mapping of geothermal resources. MT/CSAMT methods are able to easily penetrate the high-resistivity basalt cover. In fact, one of the major uses of MT has been to map conductive sedimentary layers below basalt when seismic data has been low quality.

A typical MT/AMT station layout is shown in FIG. 5A. At each measurement station, induction coils measure $H_x$, $H_y$, and $H_z$, and two orthogonal electrode arrays measure $E_x$ and $E_y$. The assumption in MT is that the naturally occurring electric fields are in the horizontal plane only—i.e. there is no vertical component to the electric field. The electrode arrays for measuring Ex and Ey are about 100 m long. Data is recorded in the frequency range 50 kHz to $10^{-3}$ Hz, allowing resistivity profiles to depths of greater than 10 km. MT data may be recorded overnight to obtain the lowest frequencies and probe the deepest depths to image the source of the geothermal anomaly.

A typical CSAMT station layout is shown in FIG. 5B. In CSAMT, one or two source dipoles are located 5-10 km from the AMT measurement stations. With CSAMT, the highest resolution will be in the depth range from surface to 3 KM. CSAMT is more sensitive than MT/AMT to subsurface resistive targets such as the mature source rocks because the controlled dipole sources generate a vertical component of the electric field.

MT/CSAMT data may be acquired along lines, similar to seismic data, but the 3-D inversion of MT/CSAMT data to subsurface conductivity structures is most accurate when acquired on uniform grid spacing. More accuracy can also be obtained when the inversion of the MT/CSAMT data is constrained by well logs and/or seismic data.

Other types of electrode resistivity profiling methods include DC electrical resistivity arrays (Schlumberger array, Wenner array, etc.) which are well known in the art. Similar to CSAMT, DC electrical resistivity profiling has the advantage of a vertical component to the electric field.

Figure 6:
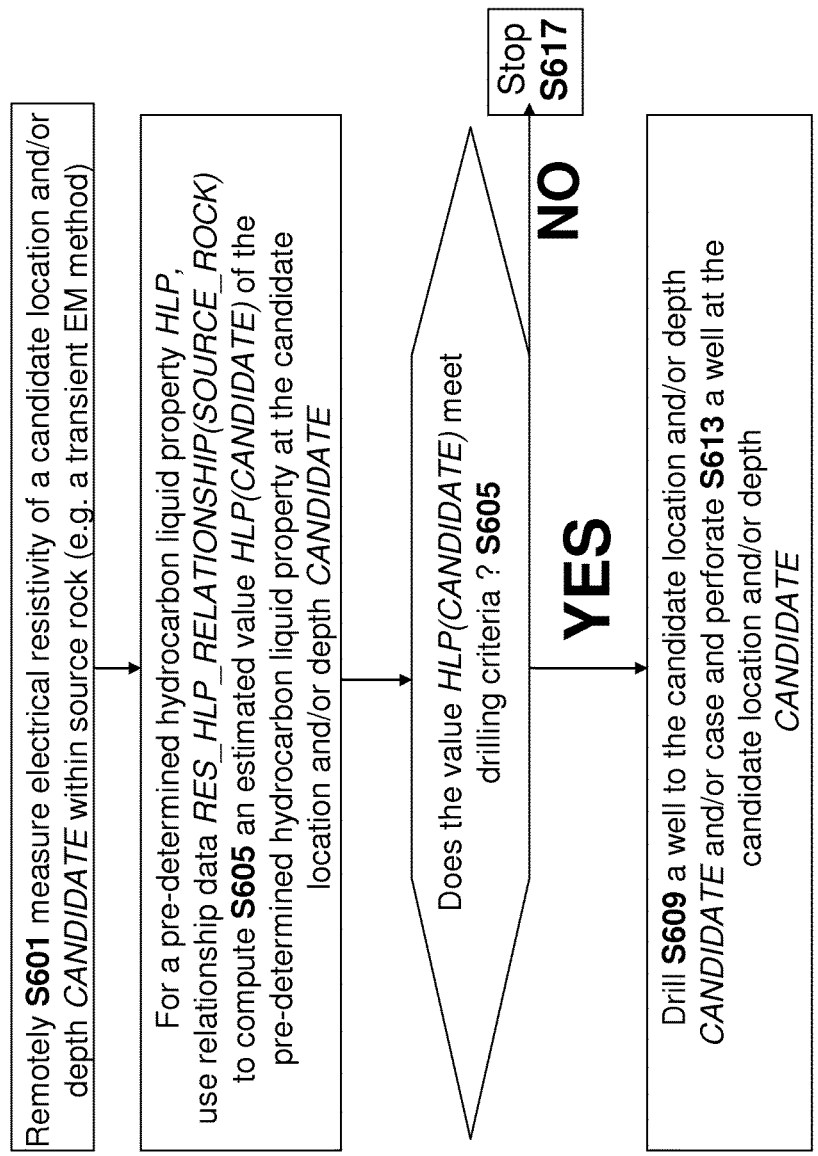

FIG. 6 is a flow chart of a method for either (i) determining whether or not to drill a well (e.g. production well) in a candidate location and/or depth; or (ii) determining whether or not to cap and perforate a well (e.g. production well) in a candidate location and/or depth.

In step S601, the electrical resistivity of a candidate location within the subsurface source rock at a candidate location and/or depth CANDIDATE is remotely measured.

For the present disclosure, 'remote measuring' or 'remote profiling' of a parameter (e.g. electrical or electromagnetic parameter—for example, resistivity) at a candidate location and/or depth CANDIDATE means that (i) there is no requirement to take samples from the candidate location and/or depth CANDIDATE and (ii) there is no requirement to drill a well or procure well log data from the candidate location and/or depth CANDIDATE.

In step S605, for a pre-determine hydrocarbon liquid property HLP, relationship data REC_HLP_RELATIONSIP (SOURCE_ROCK) is used to compute an estimated value HLP(CANDIDATE) of the hydrocarbon liquid property at the candidate location and/or depth CANDIDATE.

In the event that the value HLP(CANDIDATE) (step S607) meets some sort of 'drilling criteria', a well is drilled (step S609) or capped/perforated (step S613) at the candidate location and/or depth CANDIDATE.

A first example of a 'drilling criteria' is requiring the value HLP(CANDIDATE) to exceed a minimum threshold (e.g. minimum API gravity value). A second example of a 'drilling criteria' is requiring the value HLP(CANDIDATE) to be less than a maximum threshold (e.g. maximum sulfur content value or maximum viscosity). In a third example, the value HLP(CANDIDATE) is compared to values of the hydrocarbon liquid property other locations within the subsurface source rock (e.g. neighboring locations) to identify a local maximum or minimum. Other combinations and other criteria are possible.

Figure 7:
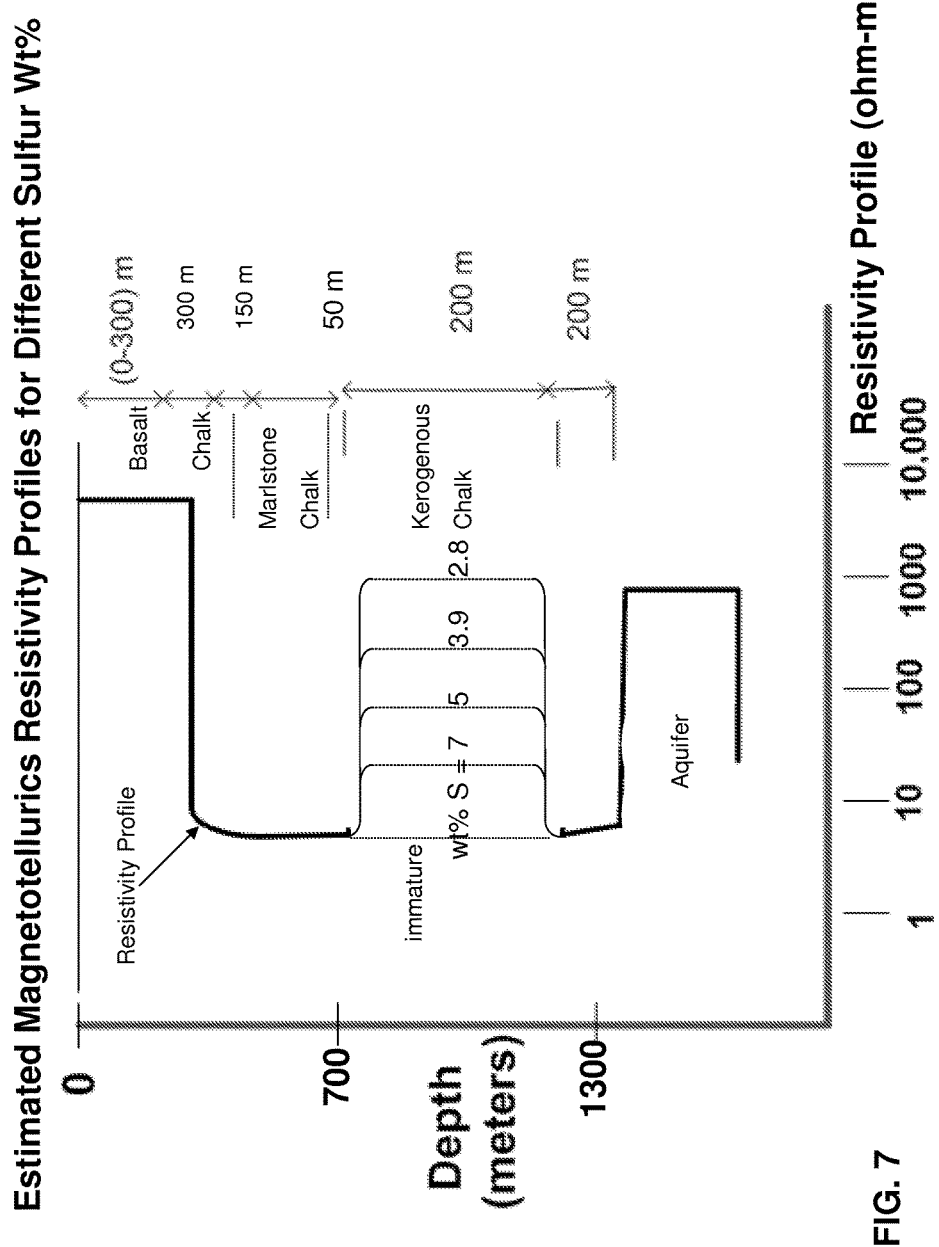
FIG. 7 illustrates a resistivity profile as a function of depth according to multiple scenarios relating to hydrocarbon liquid sulfur concentration.

FIG. 7 illustrates a resistivity profile as a function of depth according to multiple scenarios relating to hydrocarbon liquid sulfur concentration. In a first scenario, a first resistivity profile indicates a sulfur concentration value of 2.8% at depths between about 550 meters and about 900 meters. In a second scenario, a first resistivity profile indicates a sulfur concentration value of 5% at depths between about 550 meters and about 900 meters. In a third scenario, a first resistivity profile indicates a sulfur concentration value of 7% at depths between about 550 meters and about 900 meters. It is possible to identify which liquid property scenario prevails within the subsurface according to the resistivity profile measurements.

Figure 8:
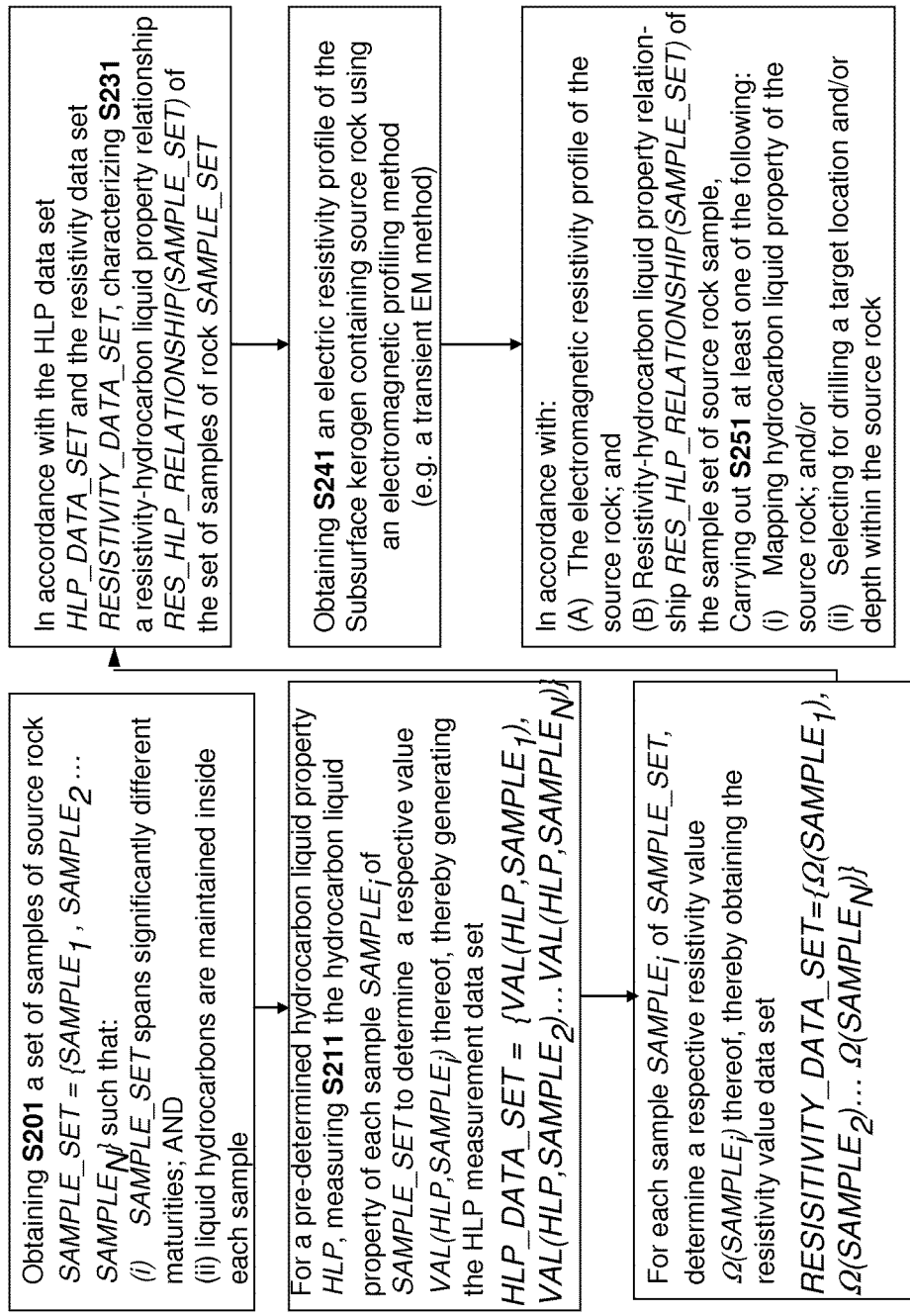

FIG. 8 is a flow chart of a technique for mapping hydrocarbon liquid properties of the subsurface and/or for selecting a drilling location in accordance with remote measurements of a resistivity profile of the source rock according to some embodiments.

In the non-limiting example of FIG. 8, source rocks samples are analyzed in the laboratory in order to correlate properties of hydrocarbon liquid within the pore space with resistivity properties of the source rock. In step S201, a set SAMPLE_SET of samples of source rocks is obtains such that each of the source rock samples has a different level of maturity. The samples of SAMPLE_SET are analyzed in the laboratory (steps S211, S221, and S231) in order to characterized a resistivity-hydrocarbon liquid property relationship RES_HLP_RELATIONSHIP(SAMPLE_SET). If the original sample set is representative of the source rock, then it is believed that RES_HLP_RELATIONSHIP(SAMPLE_SET) would provide a good approximation of RES_HLP_RELATIONSHIP(SOURCE_ROCK) of the method of FIG. 1.

In this case, steps S241 and S251 of FIG. 8 are analogous to steps S121 and S131 of FIG. 1.

One salient feature of SAMPLE_SET is that it spans significantly different maturities. The most commonly used thermal maturity indicators are:

1. Vitrinite reflectance (the Ro scale)—on this scale, Type II-s Ghareb source rock enters the oil generation stage at Ro=0.3, and enters the peak oil generation stage at about Ro=0.8.

2. Rockeval Tmax—on this scale, Type II-s Ghareb source rock enters the oil generation stage at Tmax=411° C., and enters the peak oil generation stage at about 443° C.

3. Rockeval Production Index PI—on this scale, Type II-s Ghareb source rock enters the oil generation stage at PI=0.08 and enters the peak oil generation stage at about PI=0.37.

Thus, SAMPLE_SET should (i) include samples having a vitrinite reflectance (the Ro scale) from 0.3 to about 1.2.

Figure 9:
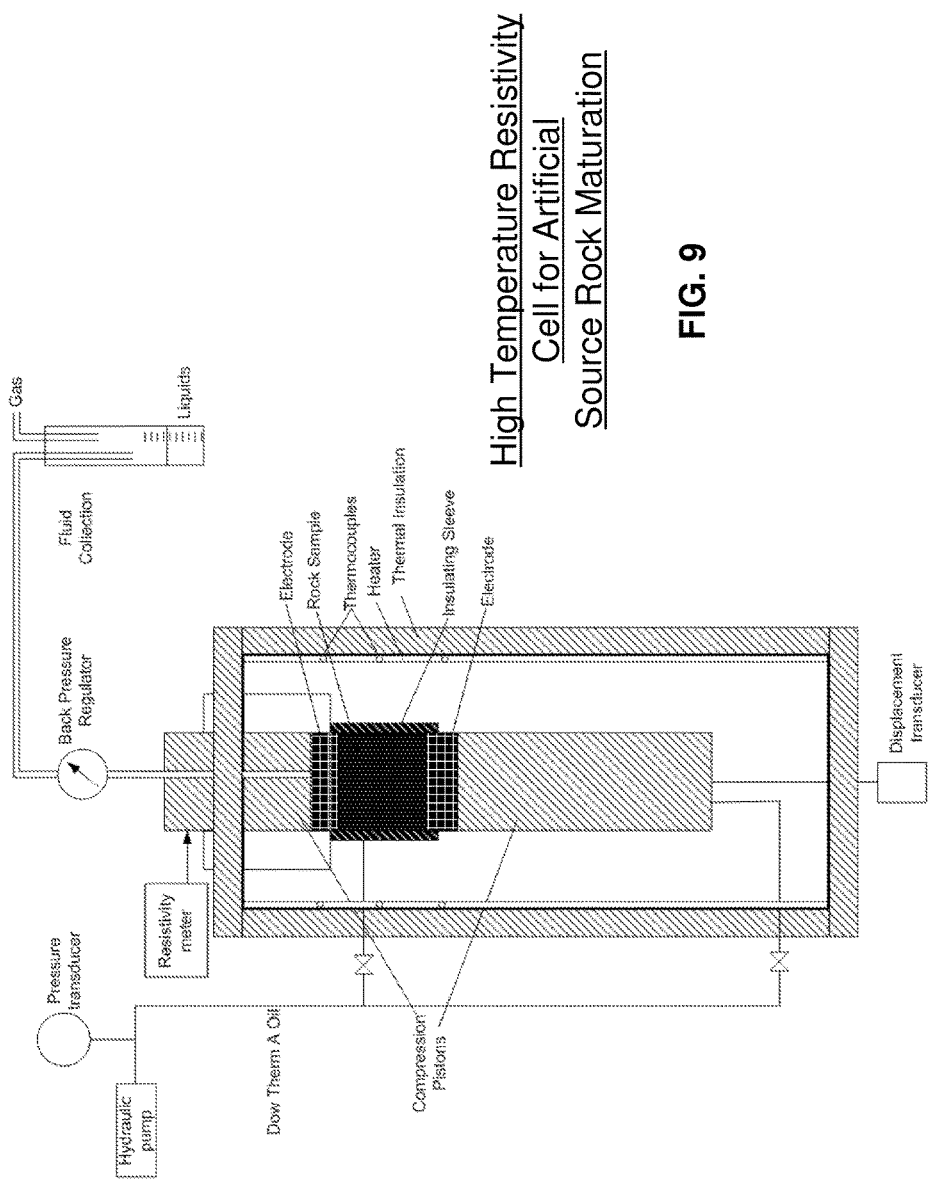
FIG. 9 illustrates a high temperature resistivity cell for artificial source rock maturation according to one example.
Figure 10:
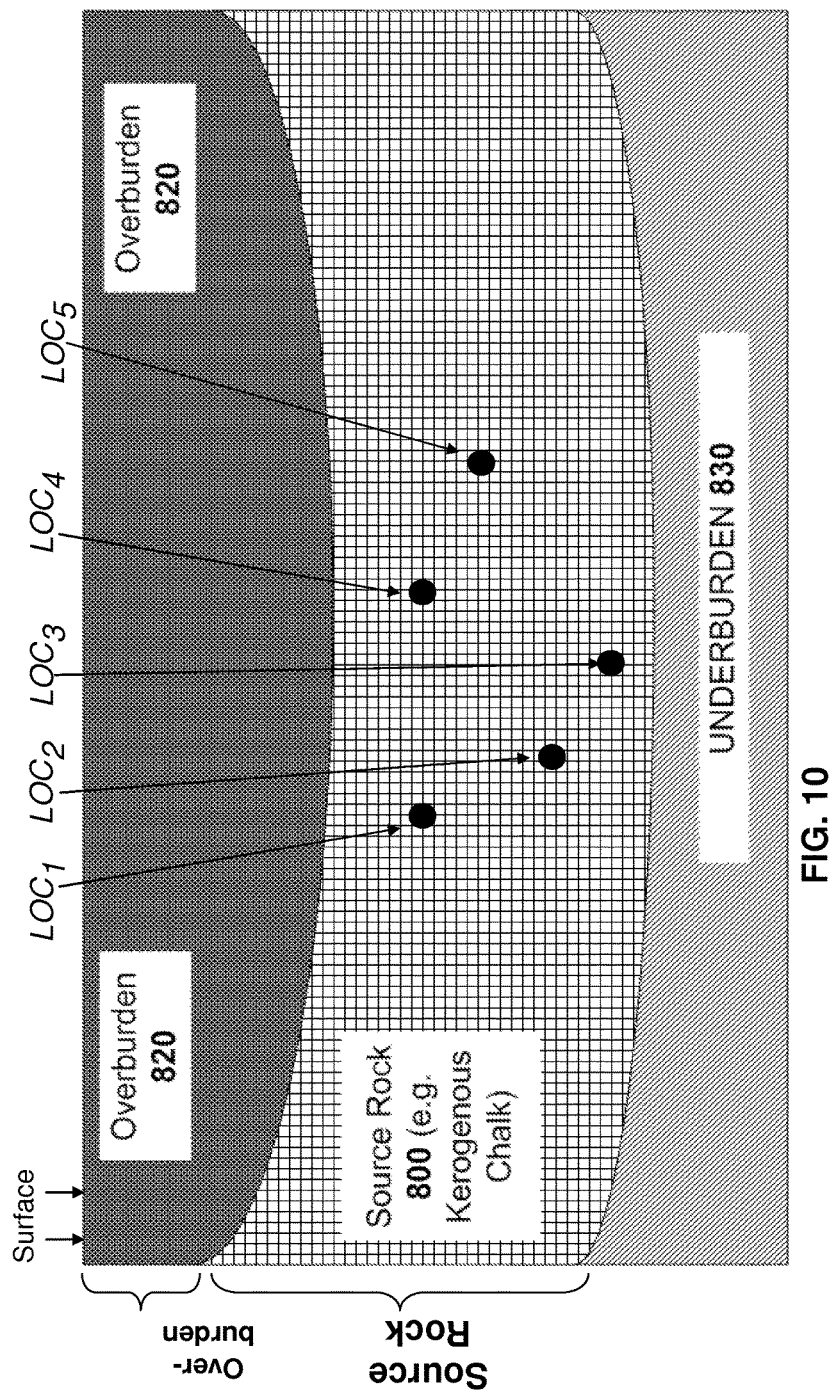
FIG. 10 illustrates multiple locations of a subsurface source rock.

In order to obtain SAMPLE_SET that spans significantly different maturities, it is possible to either subject source rock samples to an artificial maturation process (for example, see FIG. 9 and the accompanying discussion) and/or to procure rock samples of varying maturities from the subsurface source rocks—for example, from a variety of locations and/or depths (see, for example, FIG. 10).

The artificial maturation process may include employing one or more of the following techniques: hydrous pyrolysis, dry open cell pyrolysis, or pressure-regulated cell pyrolysis. The aforementioned list of artificial maturation techniques is not intended as comprehensive, and any other technique(s) or combination thereof may be employed.

According to the technique of FIG. 8, the samples of SAMPLE_SET are subjected to two measurements: (i) in step S211, it is possible to measure a property HLP of liquid hydrocarbons within pore space of the source rock samples (for example, a quantity of pore space hydrocarbon liquid may be removed from pore space of the rock sample and analyzed); and (ii) in step S221, it is possible to measure the resistivity of each of the source rock samples.

In step S231, the data of step S211 and S221 is correlated with each other—for example, as look up date or as a mathematical transformation. A graph of the mathematical transformation of RES_HLP_RELATIONSHIP(SAMPLE_SET) may be similar to what is presented in FIGS. 2 and 3.

As noted above, in some embodiments, it is possible to subject samples to an artificial maturation process. FIG. 9 illustrates a high temperature resistivity cell for artificial source rock maturation according to one example. The example of FIG. 9 relates to a so-called 'hybrid apparatus' capable both of artificially maturing source rock and measuring a resistivity thereof.

The immature source rock sample is mounted in the high temperature resistivity cell shown in FIG. 9. The source rock sample is fully saturated with the formation brine. The resistivity of the formation brine is known as a function of temperature. The sample is weighed, and its dimensions are carefully measured with a vernier caliper. The high temperature resistivity cell makes two-electrode resistivity measurements at either isostatic stress conditions or biaxial stress conditions (different radial and axial stresses) and at temperatures up to 360° C. Typically the sample is maintained at isothermal conditions in the resistivity cell for 72 hours as the kerogen partially or fully matures. This high temperature resistivity cell performs the equivalent of a hydrous pyrolysis experiment (M. Lewan et al) but allows resistivity measurements during the artificial maturation process because the formation brine and generated bitumen and oil are contained in the pores of the source rock. The back pressure regulator is set to a pressure above the saturation steam pressure at the operating temperature of the resistivity cell to prevent steam forming in the pores.

The formation resistivity factor is the ratio of the sample resistivity to the brine resistivity at a known temperature. In operation, the formation resistivity factor is measured on the sample at room temperature and then the temperature of the cell is quickly raised to the operating temperature. The resistivity will quickly change to a stable high temperature value as the sample heats in less than one hour. Then, as partial maturation occurs during the next 72 hours, kerogen in the source rock converts to bitumen, oil and gas, and some brine will be expelled and collected. The resistivity is recorded during the 72 hours of partial maturation to obtain the final value of resistivity and formation resistivity factor for the artificially matured sample.

The artificially matured sample is then allowed to cool to room temperature and the resistivity and resistivity factor are measured. The ratio of the resistivity $R_{pm}$ of the artificially matured sample to the initial resistivity $R_{im}$ of the immature sample is $R_{pm}/R_{im}$. This ratio may be computed at room temperature, at the operating temperature, or at any temperature such as the actual formation temperature. This ratio has only a weak temperature dependence, but it is most accurate for exploration if the ratio is measured at formation temperature.

After cooling, the sample may be removed from the resistivity cell. The sample is reweighed and the new sample dimensions measured. Some of the oil that was generated during artificial maturation may be centrifuged from the sample or removed by other methods such as waterflooding the sample. Some of the properties of the displaced oil, such as API gravity, wt % sulfur, and viscosity versus temperature, may be measured on the oil.

The bitumen in the artificially matured sample may be removed by solvent extraction in a Soxhlet extractor using a dichloromethane or chloroform-methanol solution (90:10). The solvent may be allowed to evaporate to leave substantially pure bitumen. Some of the properties of the bitumen, such as API gravity, wt % sulfur, and viscosity versus temperature, may be measured on the substantially pure bitumen. An index of maturation may be measured on the artificially matured sample. The maturation index may be Tmax from Rock Eval, vitrinite reflectance VR, Cormorant pollen color, or other maturation index.

These artificial maturation measurements may be repeated on substantially identical samples of immature source rock at different operating temperatures of the high temperature resistivity cell, for example, 200° C., 250° C., 280° C., 300° C., 320° C., 340° C., and 360° C.

As noted above, in some embodiments, there is no need to artificially mature source rock samples. For example, source rocks from a variety of locations and/or depths may be procured—FIG. 10 illustrates one non-limiting example where each location is labeled as $LOC_i$.

Alternatively or additionally, there is no need to even obtain actual samples—instead, well-log data relating to each location $LOC_i$ may be used. In this case, the maturities at each as $LOC_i$ should still span significantly different maturities. In one example, resistivity data is obtained from a well log. In another example, NMR well log relaxation time T2 measurements of viscosity (i.e. an example of a hydrocarbon liquid property) within hydrocarbon liquid at $LOC_i$ is used. Determining the oil viscosity by NMR log relaxation time measurements is shown in Kleinberg, R. L. and Vinegar, H. J. (1996), "NMR Properties of Reservoir Fluids", The Log Analyst, Vol. 37, No. 6., November-December, pp. 20-32 and in Morriss, C., Freedman, B., Straley, C., Johnston, M., Vinegar, H., and Tutunjian, P. (1994), "Hydrocarbon Saturation and Viscosity Estimation from NMR Logging in the Belridge Diatomite," paper C, 35th Annual SPWLA Logging Symposium, Tulsa, Okla., Jun. 19-22.

Figure 11:
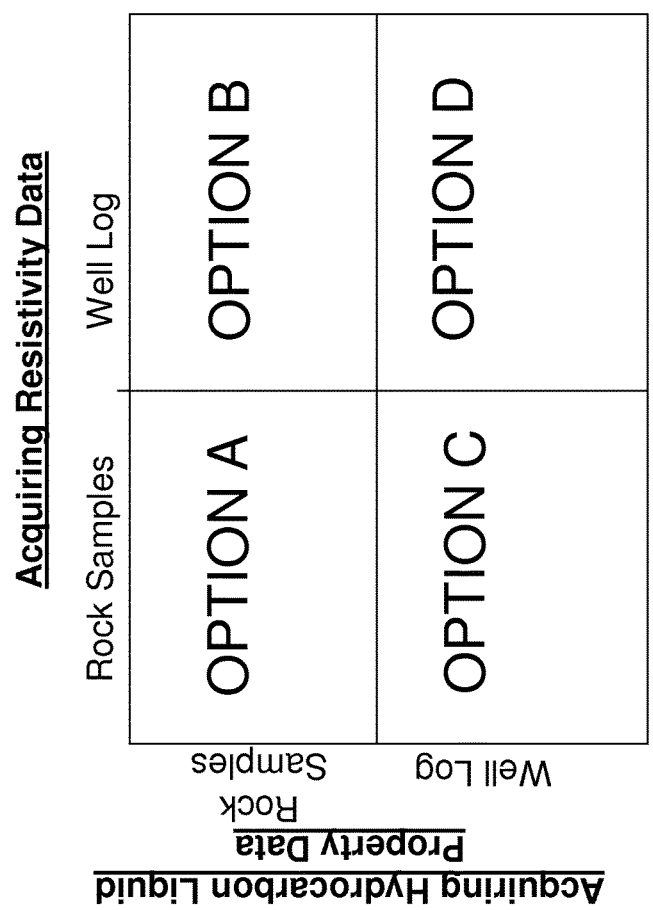
FIG. 11 illustrates various combinations related to acquisition of resistivity data and hydrocarbon liquid property data.

FIG. 11 illustrates various combinations related to acquisition of resistivity data and hydrocarbon liquid property data—in particular, four options are presented.

In the technique of FIG. 8, in order to characterize RES_HLP_RELATIONSHIP(SAMPLE_SET), the hydrocarbon liquid property was measured—for example, by subjecting a liquid sample removed from pore space of the rock samples to a viscosity or sulfur measurement. This is not a requirement.

Figure 12:
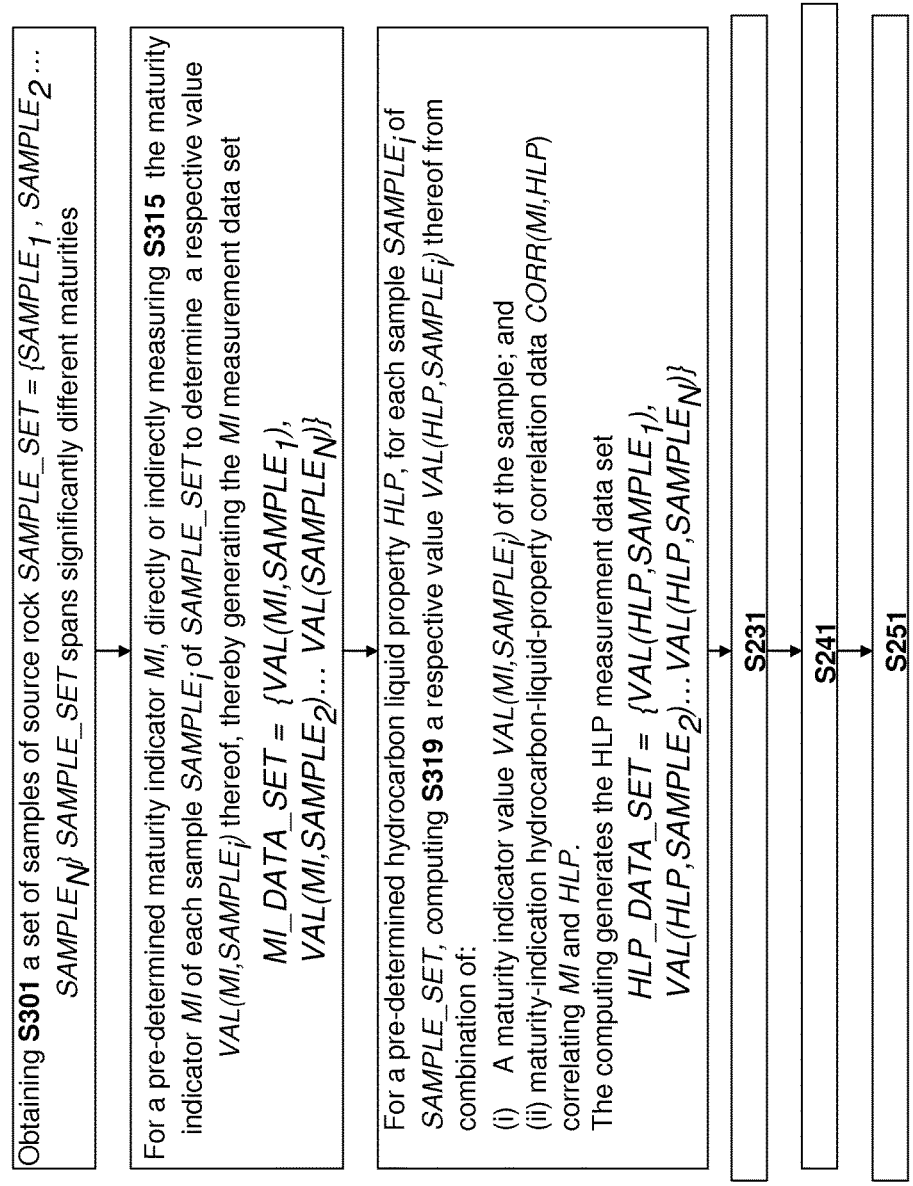

More particular, in some embodiments, rock samples as described in step S201 of FIG. 8 may not necessarily be available. In the method of FIG. 12, instead of measuring a property of the hydrocarbon liquid, it is possible to (i) measure a maturity indicator MI of each sample (e.g. vitrinite reflectance, Rockeval Tmax, Rockeval Production Index PI in step S315) to obtain an MI data set MI_DATA_SET; and (ii) mathematically transform each maturity indicator measurement into a corresponding estimated value of the hydrocarbon liquid property HLP in the pore space of the source rock of the sample in step S319.

Figure 13A:
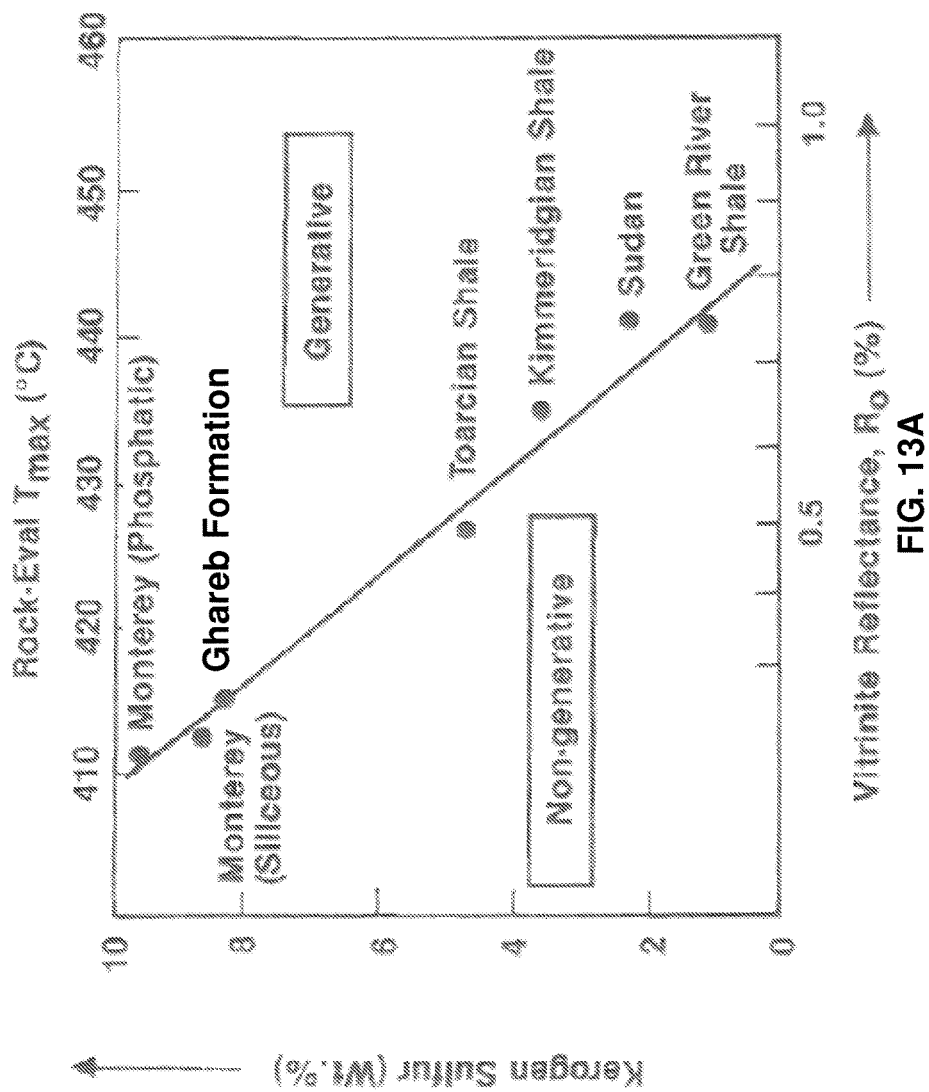
FIG. 13A illustrates the correlation between weight % sulfur in the kerogen and two source rock maturity indicators, vitrinite reflectance and Tmax.
Figure 13B:
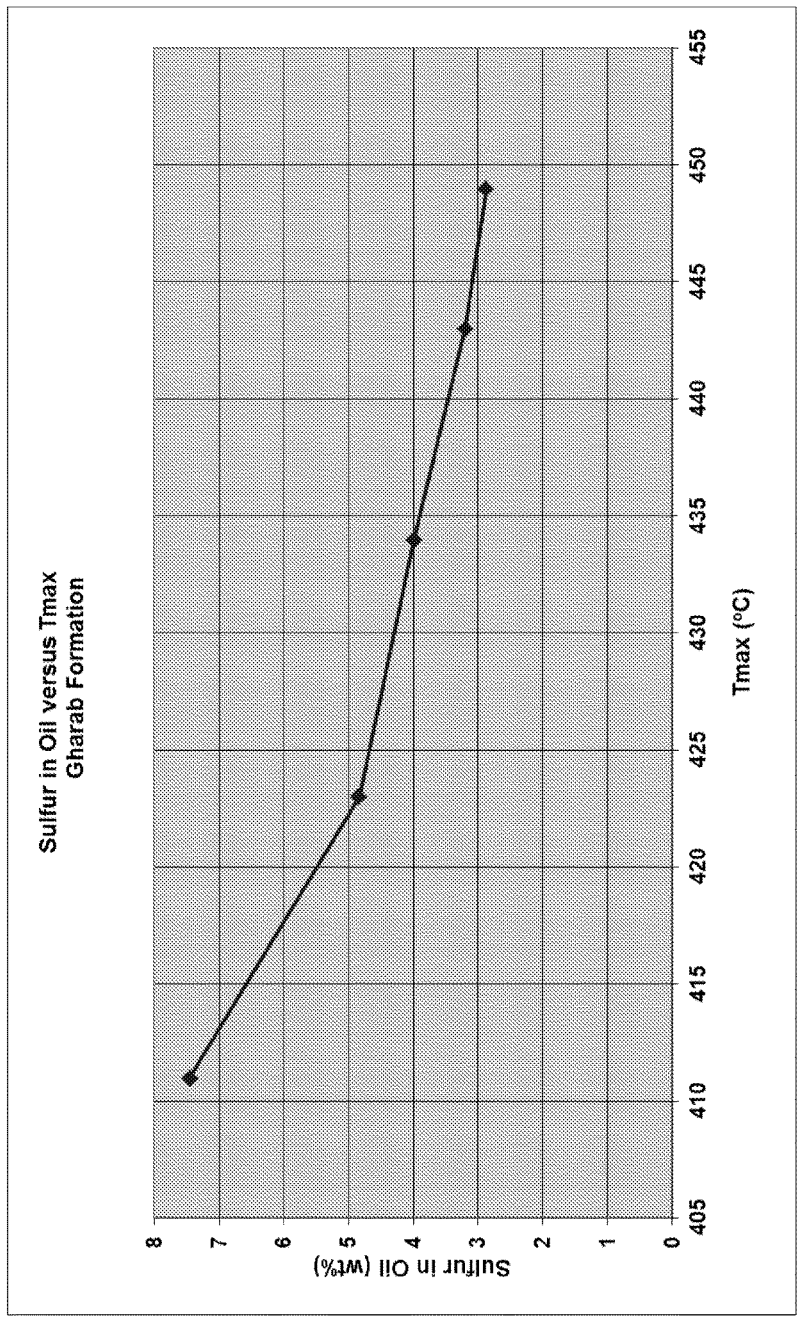
FIG. 13B illustrates, in one example related to the Ghareb Formation, a graph of maturity-indication hydrocarbon-liquid-property correlation CORR(MI,HLP) for the case where the hydrocarbon liquid property is sulfur weight percentage and where the source rock maturity indicator is Tmax.
Figure 13C:
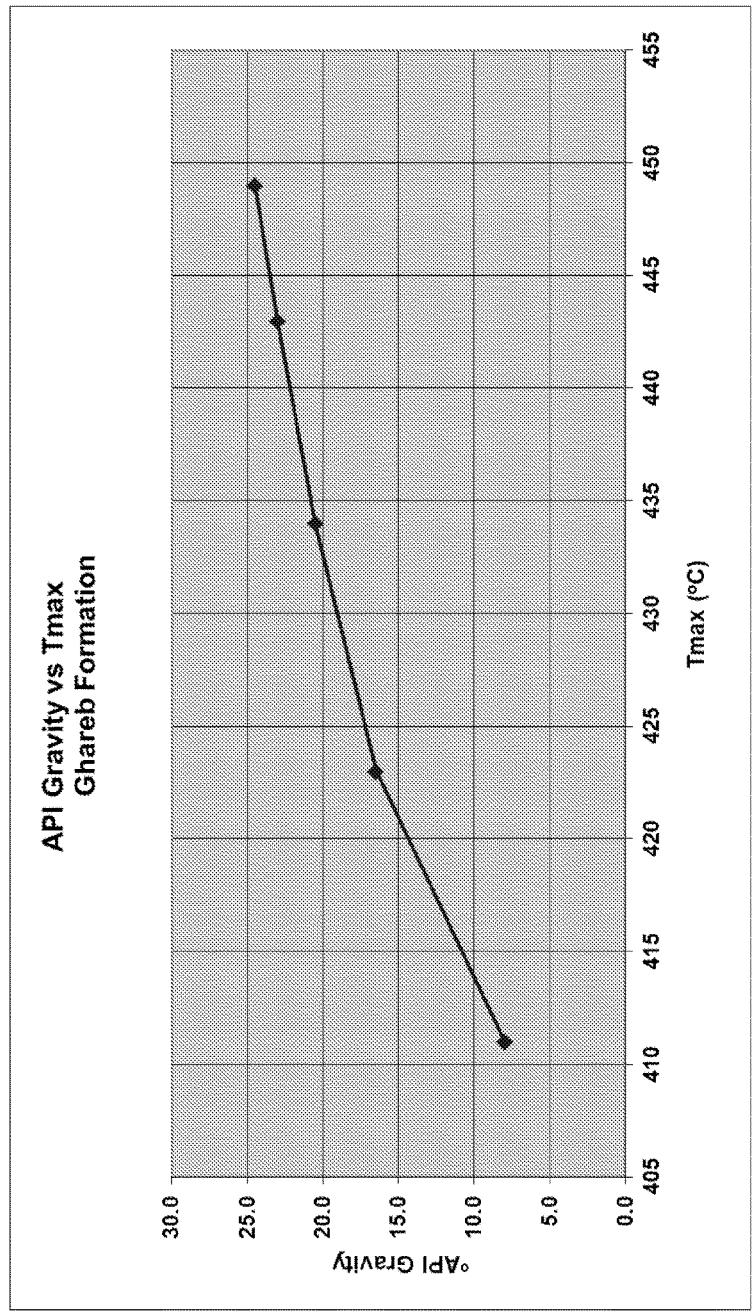
FIG. 13C illustrates, in one example related to the Ghareb Formation, a graph of maturity-indication hydrocarbon-liquid-property correlation CORR(MI,HLP) for the case where the hydrocarbon liquid property is API gravity and where the source rock maturity indicator is Tmax.

Towards this end, a mathematical relationship CORR(MI, HLP) between the maturity indicator values and the hydrocarbon liquid property values may be used. Non-limiting examples of CORR(MI,HLP) are graphed in FIGS. 13A-13C.

Once the values of the maturity indicator are mathematically transformed into respective counterpart hyrocarbon liquid property values according to CORR(MI,HLP), steps S231, S241 and S251 of FIG. 12 are the same as in the method of FIG. 8.

Referring once again to step S315 of FIG. 12, it is noted above that the most commonly used thermal maturity indicators are: (i) Vitrinite reflectance (the Ro scale) (ii) Rockeval Tmax and (iii) Rockeval Production Index PI—on this scale, Type II-s Ghareb source rock enters the oil generation stage at PI=0.08 and enters the peak oil generation stage at about PI=0.37.

Other examples of thermal maturity indicators include: Biomarkers, Thermal Alteration Index (TAI), Conodont Color Alteration Index and Time-Temperature Index (TTI).

Biomarkers are widely used as thermal maturity indicators. Biomarkers use specific parts of the GC traces (for example, C29 through C32) and compares the ratio of abundance of two compounds. The biomarker ratios change as the organic matter matures, for example, sterane and hopane ratios. These biomarker ratios have been extensively correlated to the vitrinite reflectance scale. (Peters and Moldowan (2005) "The Biomarker Guide")

Thermal alteration index (TAI) refers to changes in the color of pollen grains during thermal maturity. These ratios are also correlated to the vitrinite reflectance scale.

As noted above with reference to FIG. 11, it is possible to acquire data by well logs in addition to, or instead of, analyzing samples in the laboratory. FIG. 11 relates to hydrocarbon liquid property data and to resistivity data. FIG. 14 illustrates various combinations related to acquisition of resistivity data and source rock maturity data.

Figure 15:
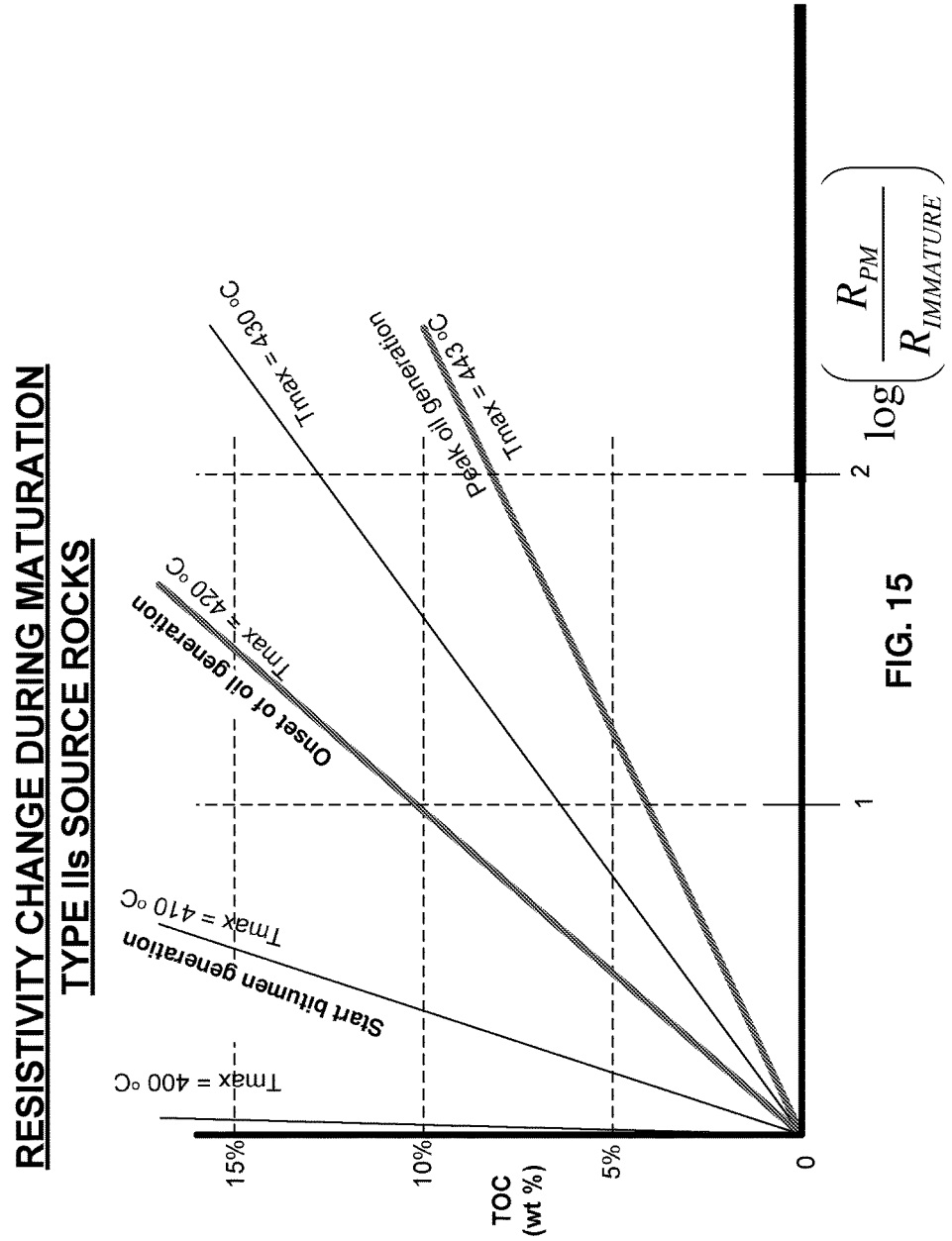
FIG. 15 illustrates, according to one example related to type II-s source rocks, a relation between source rock total organic content (TOC) and Tmax.

FIG. 15 illustrates, according to one example related to Type II-s source rocks, a relation between source rock total organic content (TOC) and Tmax and $$\log\left(\frac{R_{PM}}{R_{IMMATURE}}\right).$$

The TOC and Tmax data in FIG. 15 were obtained from drill cuttings versus depth in a well penetrating the Ghareb Formation. The resistivity data were obtained from electrical resistivity well logs in the same well as the drill cuttings. The assumption was made that the brine in the immature section of the kerogenous chalk was the same as the brine in the partially matured sections of the kerogenous chalk.

Electromagnetic sounding methods have long been used for obtaining a resistivity profile of the subsurface. These electromagnetic sounding methods include passive methods like MT (magnetotellurics) that respond to the earth's naturally occurring electromagnetic fields, and controlled source methods like TDEM (time domain electromagnetics), LOTEM (Long Offset Transient Electromagnetics) and CSAMT (controlled source audio magnetotellurics).

It is known that long offset controlled source EM methods are particularly useful for mapping thin, resistive subsurface layers (e.g. hydrocarbon saturated layers).

In the following discussion we utilized 1-D electromagnetic modeling software, LOTEMSuite by Interpex (Golden, Colorado) for LOTEM modeling, and IX1D v3 for controlled source audio magnetotellurics (CSAMT) modeling.

In LOTEM, an induction current is generated by a grounded transmitter dipole located at an offset distance (the "offset") that is far from the electric and magnetic receiver locations. In LOTEM, a "long offset" means that the offset distance is much greater than the target depth in the subsurface. LOTEM uses a bipolar current waveform that is switched on for a time period, then off, then inverted, then switched off again. The induction currents are measured during the time period when the transmitter current has been switched off. Under the long offset conditions, induction currents diffuse downward, passing through the resistive layer, before reaching the receivers. In LOTEM, the data is generally presented as electric and magnetic field intensity versus time.

In CSAMT, the surface layout is similar to LOTEM, with a grounded dipole signal source and orthogonal electric and magnetic field receivers Ex and Hy. However, the concept is somewhat different in that CSAMT is measured in the frequency domain (at multiple frequencies) and the received signals are measured in the presence of the bipolar source current. CSAMT, like MT, relies principally on skin depth. The penetration of the signal in conductive environments is less than a skin depth. The skin depth is dependent on the ground resistivity and the (angular) frequency—higher frequencies are attenuated at shallower depths and lower frequencies penetrate deeper. In CSAMT, measurements are made at multiple frequencies. In the context of CSAMT, long offset means the offset is greater than about one skin depth. In CSAMT, the data is generally presented as apparent resistivity and phase versus frequency.

Practically, in both LOTEM and CSAMT, the depth of penetration on land can be up to about 2 kilometers for good signal strength and resolution purposes, though it can be technically feasible to penetrate much deeper. Because the dipole current source is finite in distance and distinctly polarized (as opposed to an infinitely distant and non-polarized electromagnetic plane wave source in magnetotellurics), interpretation of data must include geometric effects and source overprint effects.

Magnetic Field and Electric Field Sensitivities

In electromagnetic exploration, one can measure the voltage, electric field, magnetic fields, apparent resistivity, and phase angle. The electromagnetic techniques are sensitive to resistivity and thickness variations of the subsurface, most usefully for a highly resistive target layer. Five electromagnetic field components can be measured practically at the surface (Ex, Ey, Hx, Hy, Hz). Ez cannot be measured practically at the surface, as one would need a deep well in order to measure this.

Figure 16:
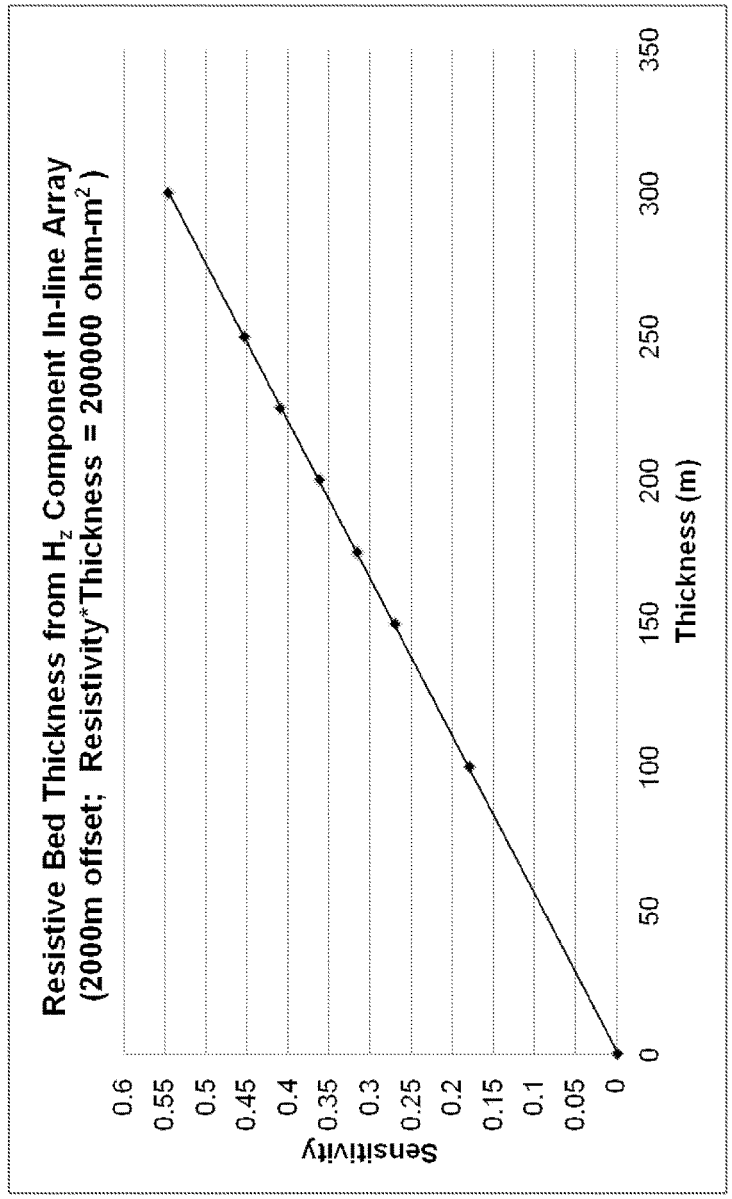
FIGS. 16-17 shows sensitivity as a function of thickness.

An Earth resistivity model is shown in FIG. 16 which shows a high resistivity target layer of 200 m thickness at a midpoint depth of 750 m. This model was utilized in the LOTEM modeling sensitivities shown in FIGS. 17, 18, and 19 and is typical of a source rock that has matured and generated the high resistivity in this layer.

Figure 17:
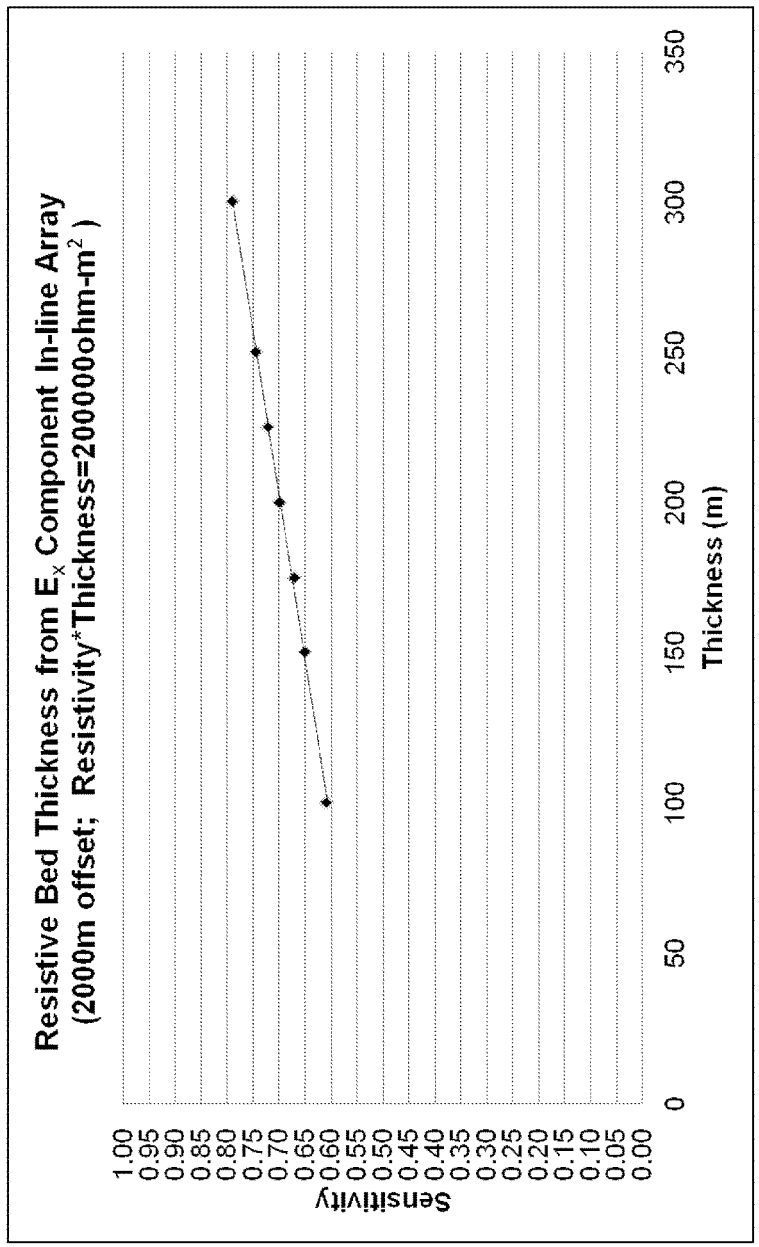
Figure 18:
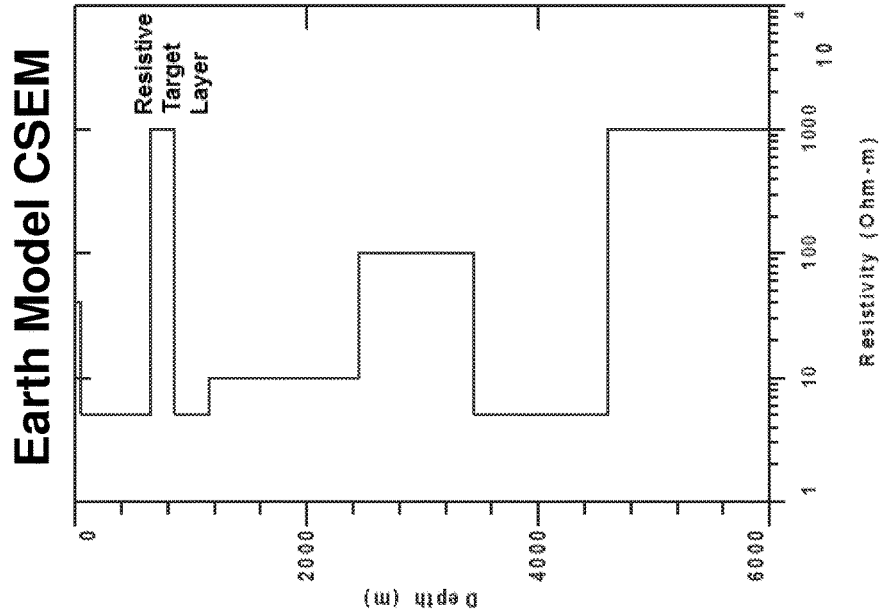
FIG. 18 shows an earth model CSEM.

The sensitivities of the electric and magnetic fields to thickness and resistivity can be seen in FIGS. 17 and 18. Sensitivity in these figures is calculated by modeling the electromagnetic fields in the case in which the resistive bed is present, subtracting from this the model in which the resistive bed is absent, and normalizing this difference by the average of the electromagnetic fields of the two models. In these models with the resistive bed present, the product of the resistivity times thickness has been kept constant, at 200,000 ohm-$m^2$ and the midpoint of the resistive bed layer has been kept at a constant depth. With a doubling of resistive bed thickness (e.g. from target layer of thickness 100 meters to a thickness of 200 meters), the sensitivity of the magnetic field component Hz also doubles (FIG. 18), whereas the electric field component Ex (FIG. 17) shows little sensitivity to variations in thickness (while the product of resistivity times thickness remains constant). Ex is mostly sensitive to the product of resistivity times thickness, while Hz is extremely sensitive to thickness. In the field, if the noise floor is high, one cannot reliably measure a change of less than 5%, so bed thickness would be difficult to determine with the Ex electric field component alone. However, the thickness of the resistive bed can be determined with the magnetic field component Hz, which will provide a more accurate resistivity model when combined with the electric field component Ex.

The conclusion from this modeling is that the electric field Ex is more sensitive to the product of resistivity times thickness whereas the magnetic field Hz is more sensitive to the thickness only. Measuring an electric field component and magnetic field component orthogonal to one another (e.g. Ex, Hz) allows the determination of resistivity and thickness separately. Since an accurate value of resistivity is critical in determining the source rock maturation according to the teachings of this invention, one must measure an orthogonal electric and magnetic field component.

While it takes only these two orthogonal electric and magnetic field components to determine the resistivity and thickness of the resistive bed layer, the other field components are also important in cases where the geology is 2-D and 3-D, as well as in cases where the beds exhibit anisotropic electrical resistivity. For example, clay laminations may cause the electrical resistivity to be higher perpendicular to the laminations than parallel to the laminations.

Differential Controlled Source Electromag

In order to obtain the most accurate values of resistivity of the target layer, in this invention two receiver dipoles are located at offsets such that the shorter offset measures mainly the overburden resistivity profile and the longer offset measures a deeper resistivity profile that includes the target layer. The two receivers measuring at the two different offsets are synchronized by GPS and highly accurate clocks. The synchronization allows the electric and magnetic field components to be subtracted from the two receivers at different offsets.

Figure 19:
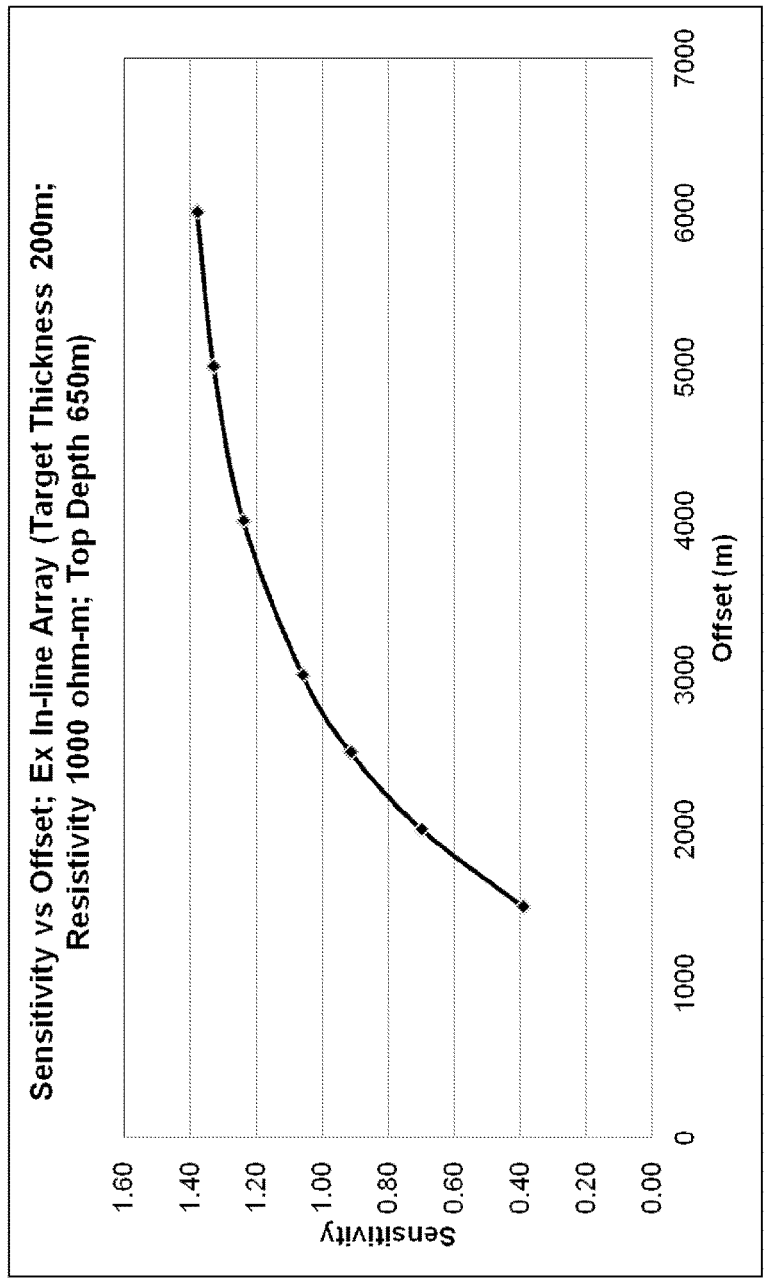
FIG. 19 shows sensitivity as a function of offset.

In order to determine the two offset locations, an offset: depth function is obtained by forward modeling with different offsets and finding when the smaller offset electromagnetic field components become insensitive to the resistive bed layer target; this is when that offset is measuring mainly the overburden resistivity profile. A LOTEM example in shown in FIG. 19. The Earth model is also given in FIG. 16, illustrating the midpoint depth of the thin resistive layer at 750 m. In FIG. 19, at an offset of 2,000 m, the normalized difference of 0.7 is about half the normalized difference of 1.35 at 5,000 m. The two receivers are placed using this relationship between the offset and sensitivity to the resistive target layer.

Seismic reflection surveys may also give a reasonable estimate of depth to the target for the forward modeling.

Figure 20:
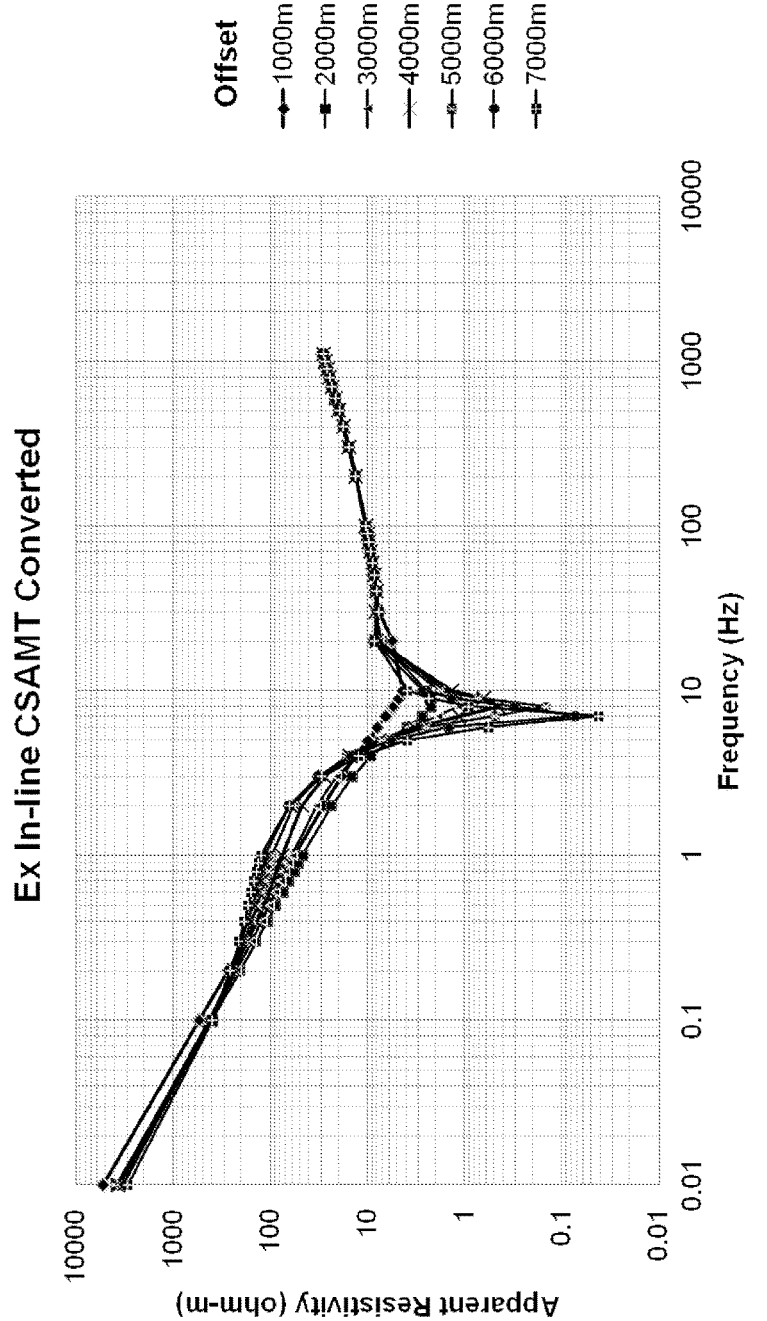
FIGS. 20-21 shows apparent resistivity as a function of frequency.

FIG. 20 measures the LOTEM sensitivity of the electric field component Ex to a target layer 200 meters thick and 1000 ohm-m resistivity, located at multiple depths. Two offsets of 2,000 m and 4,000 m are used and the normalized difference between the LOTEM Ex data are displayed. This method shows that a resistive bed layer can be detected using this differential controlled source method up to about 2000 meters below the surface.

Figure 21:
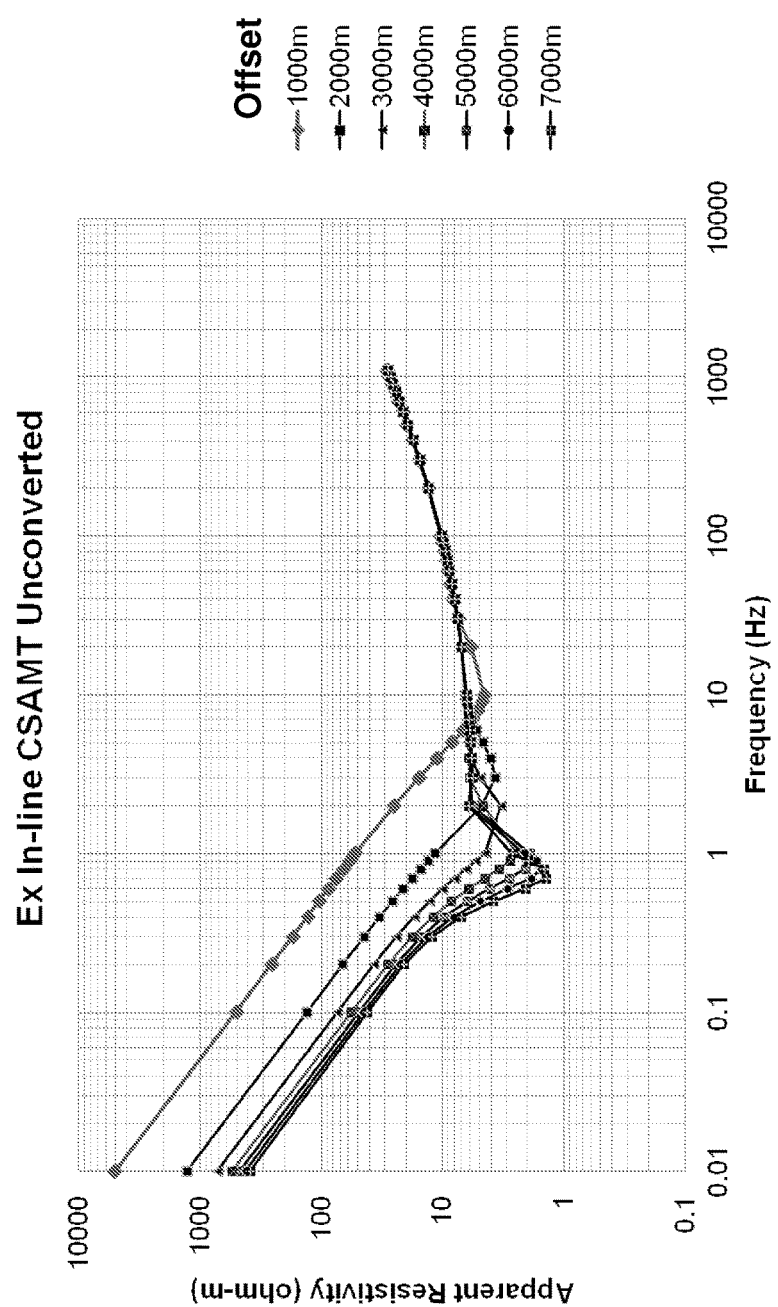

FIG. 21 shows how the differential method is applied in CSAMT. FIG. 21 shows the apparent resistivity versus frequency curves for offsets from 1000 m to 7000 m for the Earth model shown in FIG. 16. In CSAMT, the presence of a resistive layer below a conductive layer gives rise to a "notch" in the spectrum due to the resistive layer. In FIG. 21, this notch can be seen at a frequency of about 8 Hz. The choice of the two offset distances for the differential method may be made from this figure—the shorter offset responding primarily to the overburden is when only a shallow broad dip is observed (e.g. 2,000 m) whereas the longer offset should have a sharp notch (e.g. 5,000 m) in this case.

This differential method also has the advantage that common mode noise is eliminated, such as from magnetotelluric noise or atmospheric storms. These noise sources are plane waves and affect both receivers equally, so the differential subtraction eliminates this common mode noise.

Figure 22:
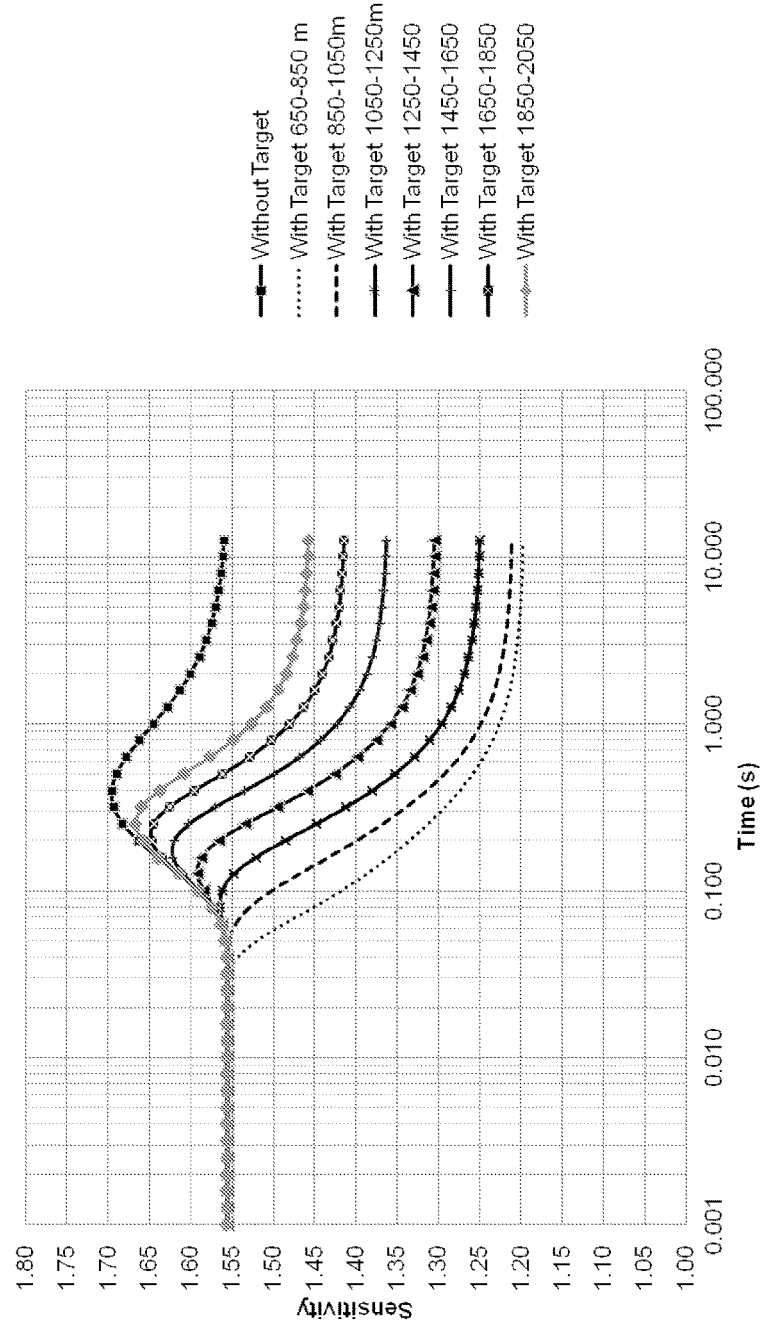
FIG. 22 shows sensitivity as a function of time.
Figure 23:
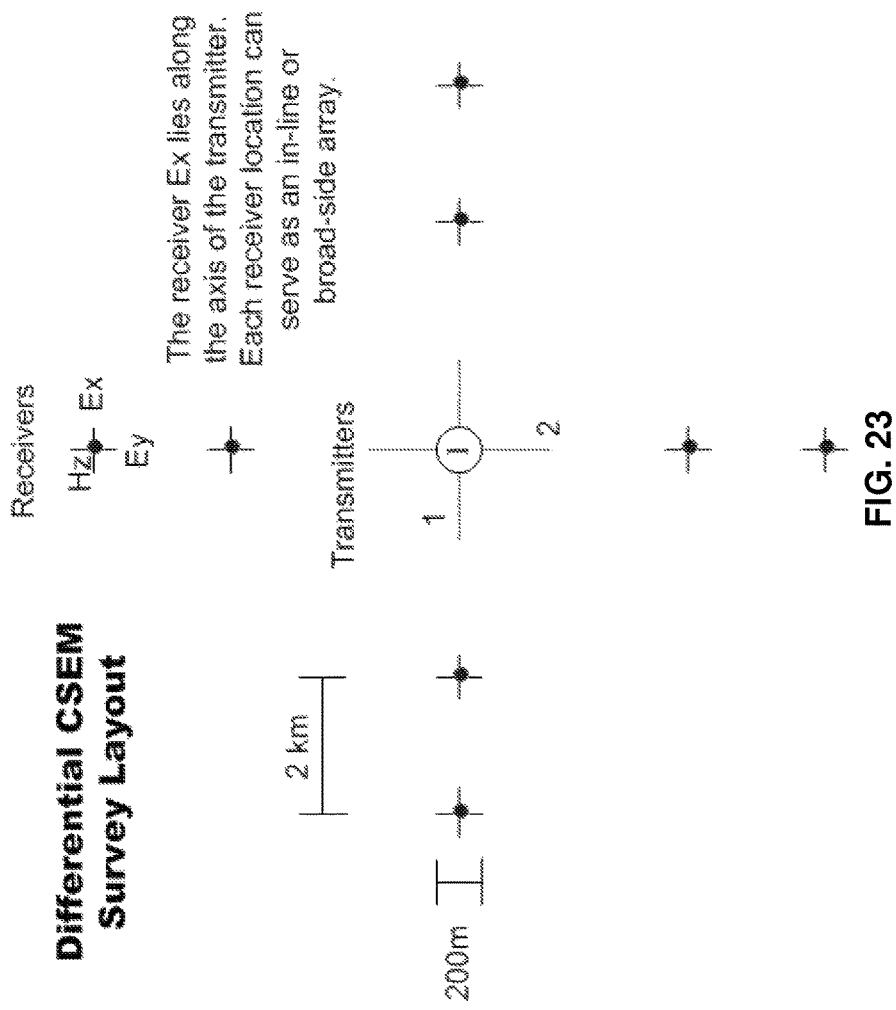
FIG. 23 shows a differential CSEM survey layout.

Another advantage of the differential offsets is the stability of the inversion modeling of the resistivity profile. For differential controlled source EM, the data from the shorter offset receivers (which primarily measures the overburden) can be inverted to obtain a resistivity model of the overburden; then, the overburden resistivity model can be fixed when inverting the longer offset data (which measures overburden plus target). This method provides a more accurate inversion of the resistivity and thickness of the target layer because there are fewer variables to be determined A preferred acquisition layout of a differential controlled source electromagnetic survey according to this invention is illustrated in FIG. 22. The x and y axes are in the plane of the page, and the z axis is coming out of the page, represented by a dot. This acquisition layout allows for the measurement in both the in-line and broadside configurations, depending on the orientation of the transmitter dipole with the receiver dipoles. The line of the transmitter dipole is the x-axis, so that the receiver electric field component Ex is parallel to the transmitter dipole axis (in line) while the receiver electric field component Ey is perpendicular to the transmitter dipole axis (broadside). This gives the tensor resistivity properties and dip and strike geology information in the x and y directions.

It is now disclosed a differential long-offset electromagnetic method of measuring one or more geological properties of a target sub-surface layer the method comprising: a. in accordance with estimated upper and lower depths of the target sub-surface layer, respectively positioning first and second electromagnetic receivers at shorter and longer offsets from a dipole transmitter so that when the receivers receive an EM signal from the dipole transmitter after propagation through the earth: i. the signal received by the first receiver at the shorter offset is governed primarily by a resistivity profile of the overburden above the upper depth of the sub-surface layer; and ii. the signal received by the second receiver at longer offset is governed primarily by combination of the overburden resistivity profile and a resistivity profile of the target layer between the upper and lower depths; b. sending an EM signal from the dipole transmitter into the earth so that the first and second receivers receive the EM signal after propagation through the earth; c. synchronizing the EM signals from the first and second receivers; d. computing a difference between the synchronized signals and e. deriving the geological property from the computed difference.

It is now disclosed a differential long-offset electromagnetic method of measuring one or more geological properties of a target sub-surface layer the method comprising: a. in accordance with estimated upper and lower depths of the target sub-surface layer, respectively positioning first and second electromagnetic receivers at shorter and longer offsets from a dipole transmitter so that when the receivers receive an EM signal from the dipole transmitter after propagation through the earth: i. the signal received by the first receiver at the shorter offset is governed primarily by a resistivity profile of the overburden above the upper depth of the sub-surface layer; and ii. the signal received by the second receiver at longer offset is governed primarily by combination of the overburden resistivity profile and a resistivity profile of the target layer between the upper and lower depths; b. sending an EM signal from the dipole transmitter into the earth so that the first and second receivers receive the EM signal after propagation through the earth; c. inverting a signal received by the first receiver to derive a resistivity profile of the overburden; d. inverting the signal received by the second receiver using the derived resistivity profile of the overburden, to obtain a resistivity profile of the combination of the target layer and the overburden.

In some embodiments, the receivers are positioned so as to be substantially co-linear with the dipole transmitter.

In some embodiments, the geological property is a thickness of the sub-surface layer.

In some embodiments, the geological property is a resistivity of the sub-surface layer.

In some embodiments, the geological property is a maturity of source-rock of the sub-surface layer.

In some embodiments, the geological property is an oil quality property of oil located within pore space of the sub-surface layer.

In some embodiments, the first and second receivers measure the electrical and magnetic fields in directions that are mutually orthogonal, and wherein the geological property is computed according to the results of the measurements in the mutually orthogonal directions.

In some embodiments, the synchronizing of the signals of the first and second receivers is carried out by employing a GPS signal and clocks in first and second receivers.

In some embodiments, the longer offset is substantially insensitive to a resistivity profile of an underburden beneath the target sub-surface layer.

In some embodiments, the measurements are carried out for a plurality of different receiver orientations disposed around the dipole transmitter.

In some embodiments, the upper and low depths are estimated by outcrop data or by seismic data.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of hydrocarbon exploration within a subsurface kerogen-containing source rock comprising:
   a. acquiring resistivity-hydrocarbon liquid property relationship-data of at least one of:
      i. a set of samples of the source rock., the sample set spanning significantly different levels of maturity; and
      ii. well-log data for a plurality of calibration locations within the source rock, the well-log data spanning significantly different levels of maturity;
   b. measuring an electric or electromagnetic resistivity profile of the subsurface kerogen containing source rock using an electromagnetic profiling method, and
   c. drilling for oil at a target location and/or depth, within the source rock, that is determined in accordance with:
      i. the electric or electromagnetic resistivity profile of the subsurface kerogen containing source rock; and
      ii. the resistivity-hydrocarbon liquid property relationship data of the set of source rock samples and/or well-log data.

2. The method of claim 1 wherein the hydrocarbon liquid property is selected from sulfur content, API gravity, and viscosity.

3. The method of claim 1 wherein the electrical or electromagnetic profiling method is a transient EM method.

4. The method of claim 3 wherein the transient EM method is long-offset transient electro magnetics (LOTEM).

5. The method of claim 1 wherein the acquired resistivity-hydrocarbon liquid property relationship-data is descriptive of the set of source rock samples.

6. The method of claim 1 wherein the acquired resistivity-hydrocarbon liquid property relationship-data is descriptive of the set of the well-log data.

7. The method of claim 1 wherein the acquired resistivity-hydrocarbon liquid property relationship-data is derived from maturity indicator measurements of samples of the sample set, the maturity measurement indicators being correlated with liquid property data.

8. The method of claim 7 where the maturity indicator is one or more of the following: Tmax, vitrinite reflectance, and Time-Temperature-Index (TTI).

9. The method of claim 7 wherein the acquired resistivity-hydrocarbon liquid property relationship-data is derived from artificially matured source rocks samples which comprise the source rock sample set.

10. The method of claim 7 wherein the well-log data includes NMR well-log data of hydrocarbon liquid viscosity at one or more subsurface locations within source rock, the resistivity-hydrocarbon liquid property relationship-data being derived from the NMR well-log data.

11. A method of hydrocarbon exploration within a subsurface kerogen-containing source rock comprising:
   a. obtaining, from the subsurface kerogen-containing source rock, at least one of:
      i. a set of samples of the source rock., the sample set spanning significantly different levels of maturity; and
      ii. well-log data for a plurality of calibration locations within the source rock, the well-log data spanning significantly different levels of maturity;
   b. acquiring resistivity-hydrocarbon liquid property relationship-data of the sample set and/or well-log data;
   c. measuring an electric or electromagnetic resistivity profile of the subsurface kerogen containing source rock using an electromagnetic profiling method, and
   d. drilling for oil at a target location and/or depth, within the source rock, that is determined in accordance with:
      i. the electric or electromagnetic resistivity profile of the subsurface kerogen containing source rock; and
      ii. the resistivity-hydrocarbon liquid property relationship data of the set of source rock samples and/or well-log data.

12. The method of claim 11 wherein the electrical or electromagnetic profiling method is a transient EM method.

13. A differential long-offset electromagnetic method of measuring one or more geological properties of a target sub-surface layer the method comprising:
   a. in accordance with estimated upper and lower depths of the target sub-surface layer, respectively positioning first and second electromagnetic receivers at shorter and longer offsets from a dipole transmitter so that when the receivers receive an EM signal from the dipole transmitter after propagation through the earth:
      i. the signal received by the first receiver at the shorter offset is governed primarily by a resistivity profile of the overburden above the upper depth of the sub-surface layer; and
      ii. the signal received by the second receiver at longer offset is governed primarily by combination of the overburden resistivity profile and a resistivity profile of the target layer between the upper and lower depths;
   b. sending an EM signal from the dipole transmitter into the earth so that the first and second receivers receive the EM signal after propagation through the earth;
   c. synchronizing the EM signals from the first and second receivers;
   d. computing a difference between the synchronized signals and
   e. deriving the geological property from the computed difference.

14. The method of claim 13 wherein the receivers are positioned so as to be substantially co-linear with the dipole transmitter.

15. The method of claim 13 wherein the geological property is a thickness of the sub-surface layer.

16. The method of claim 13 wherein the geological property is a resistivity of the sub-surface layer.

17. The method of any of claims 13 wherein the geological property is a maturity of source-rock of the sub-surface layer.

18. The method of claim 13 wherein the geological property is an oil quality property of oil located within pore space of the sub-surface layer.

19. The method of claim 13 wherein the first and second receivers measure the electrical and magnetic fields in directions that are mutually orthogonal, and wherein the geological property is computed according to the results of the measurements in the mutually orthogonal directions.

20. The method of claim 13 wherein the synchronizing of the signals of the first and second receivers is carried out by employing a GPS signal and clocks in first and second receivers.

* * * * *